United States Patent
Fujisawa et al.

(10) Patent No.: US 6,804,181 B2
(45) Date of Patent: Oct. 12, 2004

(54) DUBBING APPARATUS AND DUBBING METHOD

(75) Inventors: Hiroshi Fujisawa, Tokyo (JP); Haruyuki Miura, Kanagawa (JP); Hajime Kanno, Ibaraki (JP)

(73) Assignee: Sony Corporation, Tokyo (JP)

( * ) Notice: Subject to any disclaimer, the term of this patent is extended or adjusted under 35 U.S.C. 154(b) by 706 days.

(21) Appl. No.: 09/738,206

(22) Filed: Dec. 14, 2000

(65) Prior Publication Data

US 2001/0007544 A1 Jul. 12, 2001

(30) Foreign Application Priority Data

Dec. 24, 1999 (JP) .......................................... P11-366368

(51) Int. Cl.[7] .................................................. G11B 7/00
(52) U.S. Cl. ...................... 369/47.12; 369/47.1; 369/84; 369/47.3
(58) Field of Search ............................... 369/47.1, 47.3, 369/53.24, 84, 273, 289, 53.21, 53.37, 47.12, 47.11, 53.18; 709/219, 203, 329; 359/1–18; 386/85

(56) References Cited

U.S. PATENT DOCUMENTS

| | | | | |
|---|---|---|---|---|
| 5,432,767 A | * | 7/1995 | Utsumi et al. | 386/95 |
| 5,729,516 A | * | 3/1998 | Tozaki et al. | 369/53.21 |
| 5,963,521 A | * | 10/1999 | Nagashima et al. | 369/53.37 |
| 6,298,022 B1 | * | 10/2001 | Aramaki et al. | 369/47.11 |
| 6,388,766 B1 | * | 5/2002 | Inoue et al. | 358/1.18 |
| 6,408,332 B1 | * | 6/2002 | Matsumoto et al. | 709/219 |
| 6,603,718 B1 | * | 8/2003 | Ozawa | 369/47.1 |

* cited by examiner

Primary Examiner—William Korzuch
Assistant Examiner—Kim-Kwok Chu
(74) Attorney, Agent, or Firm—Oblon, Spivak, McClelland, Maier & Neustadt, P.C.

(57) ABSTRACT

A dubbing apparatus for inhibiting high-speed dubbing for a predetermined time period if, at a time of high-speed dubbing of a program from a first storage medium onto a second storage medium, the first storage medium is found to have been subjected to high-speed dubbing earlier by another predetermined time period. The apparatus is arranged to indicate that high-speed dubbing is being inhibited while displaying a waiting time to be observed before high-speed dubbing is again permitted.

10 Claims, 15 Drawing Sheets

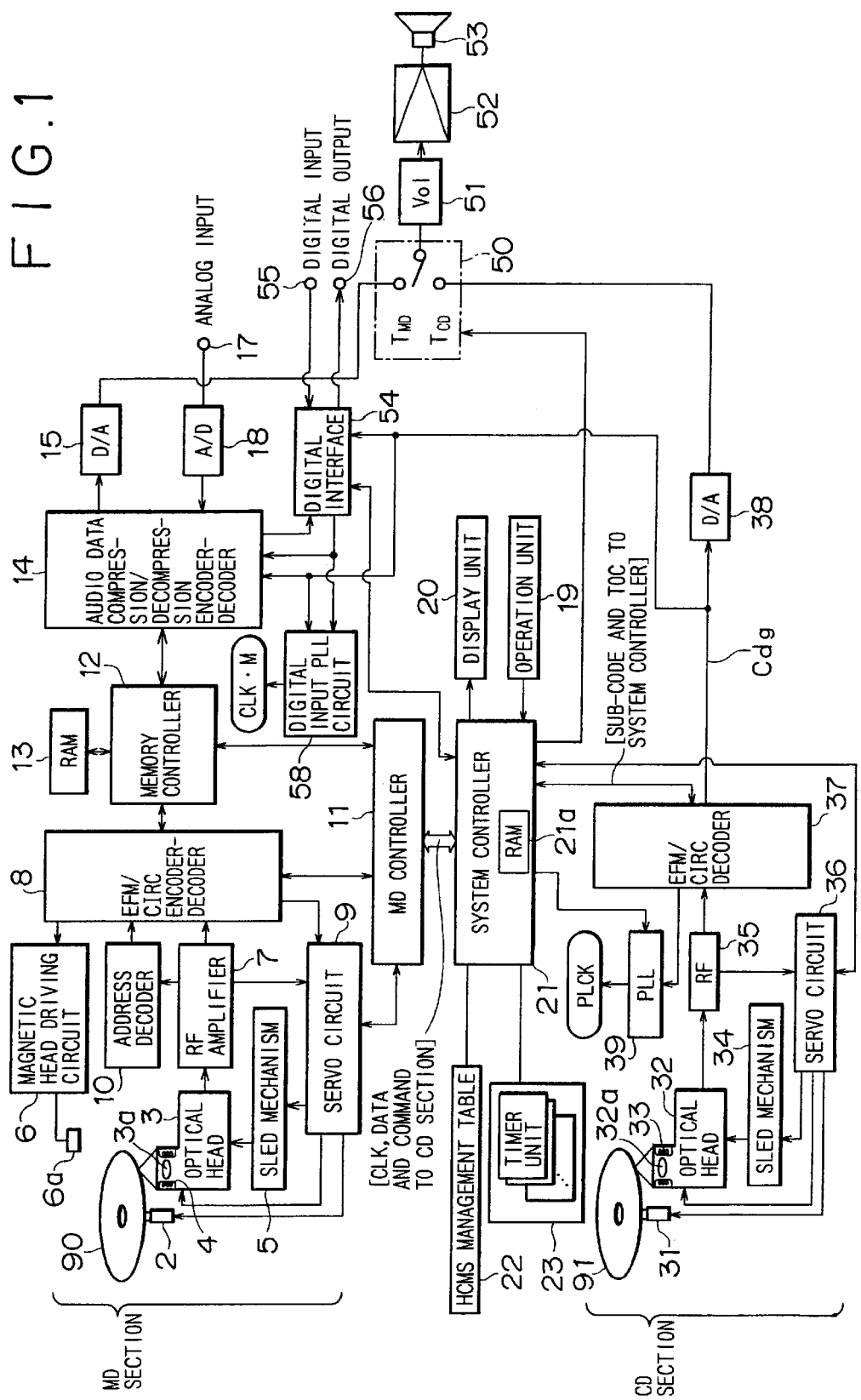

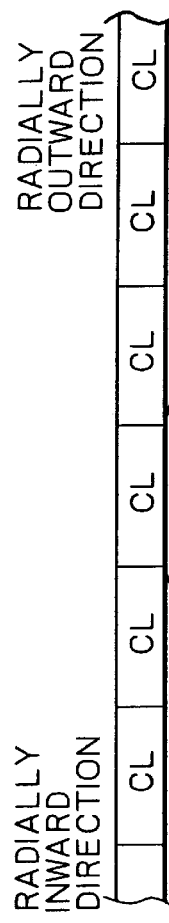
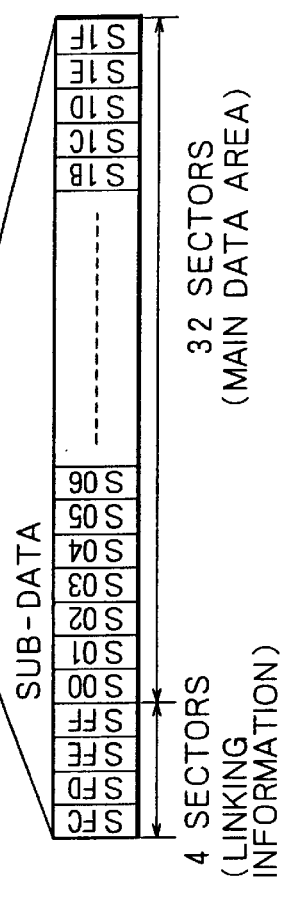
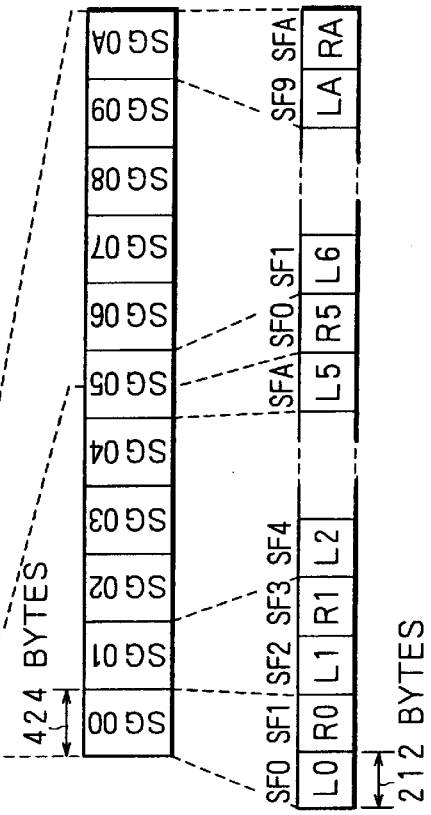
FIG. 2A
FIG. 2B
FIG. 2C
FIG. 2D
FIG. 2E

FIG.3

| 16 bits | | 16 bits | | |
|---|---|---|---|---|
| MSB      LSB | MSB      LSB | MSB      LSB | MSB      LSB | |

<table>
<tr><td rowspan="3">HEADER</td><td>00000000</td><td>11111111</td><td>11111111</td><td>11111111</td><td>0</td></tr>
<tr><td>11111111</td><td>11111111</td><td>11111111</td><td>11111111</td><td>1</td></tr>
<tr><td>11111111</td><td>11111111</td><td>11111111</td><td>00000000</td><td>2</td></tr>
<tr><td></td><td>ClusterH</td><td>ClusterL</td><td>Sector</td><td>00000010</td><td>3</td></tr>
<tr><td></td><td>00000000</td><td>00000000</td><td>00000000</td><td>00000000</td><td>4</td></tr>
<tr><td></td><td>00000000</td><td>00000000</td><td>00000000</td><td>00000000</td><td>5</td></tr>
<tr><td></td><td>00000000</td><td>00000000</td><td>00000000</td><td>00000000</td><td>6</td></tr>
<tr><td></td><td>Maker code</td><td>Model code</td><td>First TNO</td><td>Last TNO</td><td>7</td></tr>
<tr><td></td><td>00000000</td><td>00000000</td><td>00000000</td><td>Used Sectors</td><td>8</td></tr>
<tr><td></td><td>00000000</td><td>00000000</td><td>00000000</td><td>00000000</td><td>9</td></tr>
<tr><td></td><td>00000000</td><td>00000000</td><td>00000000</td><td>Disc Serial No</td><td>10</td></tr>
<tr><td rowspan="6">CORRESPONDING TABLE DESIGNATING DATA</td><td colspan="2">Disc ID</td><td>P-DFA</td><td>P-EMPTY</td><td>11</td></tr>
<tr><td>P-FRA</td><td>P-TNO1</td><td>P-TNO2</td><td>P-TNO3</td><td>12</td></tr>
<tr><td>P-TNO4</td><td>P-TNO5</td><td>P-TNO6</td><td>P-TNO7</td><td>13</td></tr>
<tr><td>P-TNO248</td><td>P-TNO249</td><td>P-TNO250</td><td>P-TNO251</td><td>74</td></tr>
<tr><td>P-TNO252</td><td>P-TNO253</td><td>P-TNO254</td><td>P-TNO255</td><td>75</td></tr>
<tr><td>00000000</td><td>00000000</td><td>00000000</td><td>00000000</td><td>76</td></tr>
<tr><td></td><td>00000000</td><td>00000000</td><td>00000000</td><td>00000000</td><td>77</td></tr>
<tr><td>(01h)</td><td colspan="3">START ADDRESS</td><td>TRACK MODE</td><td>78</td></tr>
<tr><td></td><td colspan="3">END ADDRESS</td><td>LINK INFORMATION</td><td>79</td></tr>
<tr><td>(02h)</td><td colspan="3">START ADDRESS</td><td>TRACK MODE</td><td>80</td></tr>
<tr><td></td><td colspan="3">END ADDRESS</td><td>LINK INFORMATION</td><td>81</td></tr>
<tr><td>(03h)</td><td colspan="3">START ADDRESS</td><td>TRACK MODE</td><td>82</td></tr>
<tr><td></td><td colspan="3">END ADDRESS</td><td>LINK INFORMATION</td><td>83</td></tr>
<tr><td>(FCh)</td><td colspan="3">START ADDRESS</td><td>TRACK MODE</td><td>580</td></tr>
<tr><td></td><td colspan="3">END ADDRESS</td><td>LINK INFORMATION</td><td>581</td></tr>
<tr><td>(FDh)</td><td colspan="3">START ADDRESS</td><td>TRACK MODE</td><td>582</td></tr>
<tr><td></td><td colspan="3">END ADDRESS</td><td>LINK INFORMATION</td><td>583</td></tr>
<tr><td>(FEh)</td><td colspan="3">START ADDRESS</td><td>TRACK MODE</td><td>584</td></tr>
<tr><td></td><td colspan="3">END ADDRESS</td><td>LINK INFORMATION</td><td>585</td></tr>
<tr><td>(FFh)</td><td colspan="3">START ADDRESS</td><td>TRACK MODE</td><td>586</td></tr>
<tr><td></td><td colspan="3">END ADDRESS</td><td>LINK INFORMATION</td><td>587</td></tr>
</table>

MANAGEMENT TABLE (255 SLOTS)

U-TOC SECTOR 0

FIG. 5
FRAME STRUCTURE
| SYNCH-RONIZING DATA | SUB-CODING | DATA | PARITY | DATA | PARITY |
|← 24 →|← 14 →|
←——————————— 588 BITS ———————————→
FIG. 6A
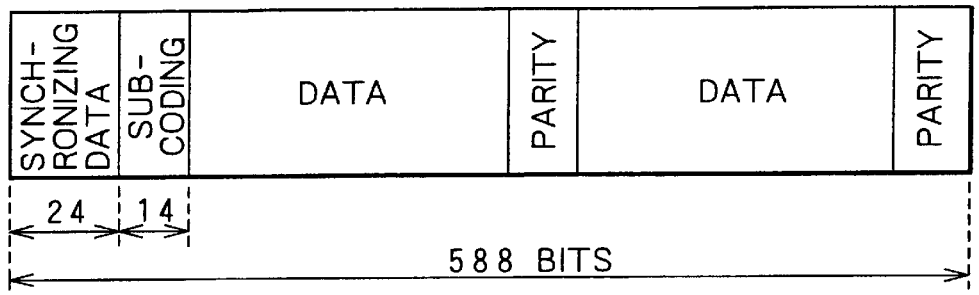
| FRAME | SUB-CODING FRAME |
|---|---|
| 98n+1 | SYNCHRONIZING PATTERN |
| 98n+2 | SYNCHRONIZING PATTERN |
| 98n+3 | P1 Q1 R1 S1 T1 U1 V1 W1 |
| 98n+4 | P2 Q2 R2 S2 T2 U2 V2 W2 |
| ⋮ | ⋮ |
| 98n+97 | P95 Q95 R95 S95 T95 U95 V95 W95 |
| 98n+98 | P96 Q96 R96 S96 T96 U96 V96 W96 |
| 98(n+1)+1 | |
FIG. 6B
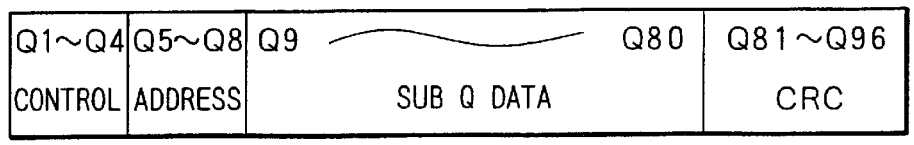
| Q1~Q4 | Q5~Q8 | Q9 ———— Q80 | Q81~Q96 |
|---|---|---|---|
| CONTROL | ADDRESS | SUB Q DATA | CRC |

FIG. 8

TOC STRUCTURE (OF A 6-TRACK DISC)

| TNO | BLOCK No. | POINT | PMIN, PSEC, PFRAME | |
|---|---|---|---|---|
| 00 | n | 01 | 00.02.32 | START POINT OF TRACK #1 |
| | n+1 | 01 | 00.02.32 | |
| | n+2 | 01 | 00.02.32 | |
| | n+3 | 02 | 10.15.12 | START POINT OF TRACK #2 |
| | n+4 | 02 | 10.15.12 | |
| | n+5 | 02 | 10.15.12 | |
| | n+6 | 03 | 16.28.63 | START POINT OF TRACK #3 |
| | n+7 | 03 | 16.28.63 | |
| | n+8 | 03 | 16.28.63 | |
| | n+9 | 04 | . . | |
| | n+10 | 04 | . . | |
| | n+11 | 04 | . . | |
| | n+12 | 05 | . . | |
| | n+13 | 05 | . . | |
| | n+14 | 05 | . . | |
| | n+15 | 06 | 49.10.03 | START POINT OF TRACK #6 |
| | n+16 | 06 | 49.10.03 | |
| | n+17 | 06 | 49.10.03 | |
| | n+18 | A0 | 01.00.00 | TRACK NO. OF FIRST TRACK ON DISC |
| | n+19 | A0 | 01.00.00 | |
| | n+20 | A0 | 01.00.00 | |
| | n+21 | A1 | 06.00.00 | TRACK NO. OF LAST TRACK ON DISC |
| | n+22 | A1 | 06.00.00 | |
| | n+23 | A1 | 06.00.00 | |
| | n+24 | A2 | 52.48.41 | START POINT OF LEAD-OUT TRACK |
| | n+25 | A2 | 52.48.41 | |
| 00 | n+26 | A2 | 52.48.41 | |
| 00 | n+27 | 01 | 00.02.32 | TO BE REPEATED |
| | n+28 | 01 | 00.02.32 | |
| | . | . | . . | |
| | . | . | . . | |
| | . | . | . . | |

FIG.10

| Character | Binary | Octal |
|---|---|---|
| 0 | 000000 | 00 |
| 1 | 000001 | 01 |
| 2 | 000010 | 02 |
| 3 | 000011 | 03 |
| 4 | 000100 | 04 |
| 5 | 000101 | 05 |
| 6 | 000110 | 06 |
| 7 | 000111 | 07 |
| 8 | 001000 | 10 |
| 9 | 001001 | 11 |
| A | 010001 | 21 |
| B | 010010 | 22 |
| C | 010011 | 23 |
| D | 010100 | 24 |
| E | 010101 | 25 |
| F | 010110 | 26 |
| G | 010111 | 27 |
| H | 011000 | 30 |
| I | 011001 | 31 |
| J | 011010 | 32 |
| K | 011011 | 33 |
| L | 011100 | 34 |
| M | 011101 | 35 |
| N | 011110 | 36 |
| O | 011111 | 37 |
| P | 100000 | 40 |
| Q | 100001 | 41 |
| R | 100010 | 42 |
| S | 100011 | 43 |
| T | 100100 | 44 |
| U | 100101 | 45 |
| V | 100110 | 46 |
| W | 100111 | 47 |
| X | 101000 | 50 |
| Y | 101001 | 51 |
| Z | 101010 | 52 |

DUBBING APPARATUS AND DUBBING METHOD

BACKGROUND OF THE INVENTION

The present invention relates to a dubbing apparatus and a dubbing method. More particularly, the invention relates to a dubbing apparatus and a dubbing method designed for copyright protection using functions to manage program data to be dubbed.

In recent years, CD players for playing back CDs (compact discs) have come into general use. Concurrently gaining widespread acceptance are disc media such as Mini-disc (MD) to and from which audio data are recorded and reproduced, as well as recording and reproducing apparatuses for handling such disc media. Today, audio systems combining an MD recorder/player addressing the MD with a CD player are also receiving widespread use.

The MD recorder/player, CD player, and systems combining these devices manage audio data in units of so-called programs. In this specification, a program refers to a group of data recorded and managed as a data unit on the disc. Illustratively, one piece of music (generally known as a track) represents one program of audio data. In the description that follows, the words "programs" and "tracks" will be used interchangeably.

Audio systems of the above-described type are generally capable of what is known as dubbing recording, i.e., a procedure for recording audio data reproduced by a CD player onto an MD loaded in an MD recorder/player. Some systems are designed to offer so-called high-speed dubbing so as to shorten the time of dubbing recording.

In high-speed dubbing mode, the CD player controls its disc drive control portion and its reproduced signal processing portion in such a manner as to reproduce data from a CD at a predetermined multiple-fold speed, i.e., a speed multiplying a standard speed by a predetermined value. On the side of the MD recorder/player, its recording circuit portion is controlled to operate in keeping with the multiple-fold playback speed for the CD in question so as to receive audio data from the CD player for recording onto an MD.

Illustratively, for equipment combining a CD player (reproducing apparatus) integrally with an MD recorder/player (recording apparatus), it is easy to control the two devices concurrently at the predetermined multiple-fold speed for high-speed dubbing. If the recording apparatus is physically separated from the recording apparatus, the two may still be connected via a control cable or the like for interactive communication therebetween, whereby operations of the two devices are readily controlled in synchronism for high-speed dubbing.

Dubbing speeds are defined as follows: if it takes 74 minutes to dub the contents of a 74-minute-long CD onto an MD, the process is defined as standard-speed dubbing. If it takes 37 minutes to dub the 74-minute-long CD onto the MD, the process is defined as double-speed dubbing.

The act of dubbing involves duplicating copyrighted materials such as pieces of music and is thus regarded by those concerned as detrimental to copyright holders' benefits. From their point of view, dubbing is an act that should be discouraged and if possible prohibited.

The fact is that there is widespread practice of dubbing at speeds higher than the standard speed. That means there have been trends toward greater numbers of pieces of music (tracks) dubbed per unit time at higher speeds than at the standard speed.

Suppose that a user intends to copy one CD or one of the pieces of music (tracks) on the CD onto MDs (or like storage medium) which are so numerous that they exceed the reasonably expected range of personal use, and that the user plans to sell the multiplied MDs containing the same contents to third parties.

In that case, if the user employs a high-speed dubbing function to copy pieces of music (tracks) to MDs at a higher speed, the MDs will be prepared more efficiently than if the copying is done at the standard speed. That is, the high-speed dubbing function can encourage an infringement of copyrights.

Under such circumstances, a standard called HCMS (High-speed Copy Management System) has been proposed. HCMS stipulates that when digital sound sources such as a CD are recorded at high speed to storage media such as MDs, any one track (piece of music) once dubbed at high speed is to be inhibited from being dubbed again at high speed for at least 74 minutes starting from the time the track in question began to be dubbed at high speed. The high-speed dubbing inhibited time is set for 74 minutes because the maximum playback time of a CD is nominally 74 minutes. In other words, high-speed dubbing is suppressed during the period of time required normally to play back an entire CD. This measure is designed to keep the efficiency of dubbing per track substantially at the same level as in standard-speed dubbing. If dubbing apparatuses have an HCMS-compatible structure restricting high-speed dubbing as described, they can be employed by users dubbing desired recordings without infringing on copyrights. As long as relevant HCMS provisions are observed, the other specifications of apparatuses equipped with the dubbing function may be determined as desired. The 74-minute dubbing-restricted period may be varied if necessary.

On every dubbing apparatus subject to HCMS restrictions on high-speed dubbing, any track on a CD is thus barred from getting dubbed at high speed regardless of attempts at such recording, until the obligatory 74 minutes elapse following the most recent dubbing of the same track.

Where general users are immersed in dubbing a number of tracks on CDs over a short period of time, they cannot be expected always to remember clearly which track (piece of music) on which CD was recorded exactly how many minutes ago.

Suppose now that an attempt to dub a given track (piece of music, currently subject to restrictions on high-speed dubbing) is simply rejected, with no explanation provided to remind the user of the temporary injunction against high-speed dubbing. This may have the user worried or even distrustful of normal functioning of the apparatus.

What is thus preferred is a dubbing apparatus which, equipped with a function for restricting high-speed dubbing under HCMS provisions, is capable of notifying the user how the dubbing process is currently managed. Such an apparatus is more convenient for the user in dubbing situations than its conventional counterparts.

SUMMARY OF THE INVENTION

In solving the foregoing and other problems of the related art and according to one aspect of the invention, there is provided a dubbing apparatus for dubbing programs from a first storage medium onto a second storage medium, the dubbing apparatus comprising: a clocking element for starting to clock the time when a program held on the first storage medium starts being dubbed onto the second storage medium at a high speed over a period shorter than an actual playback time; a storing element for storing the times clocked by the clocking element regarding individual programs held on the first storage medium; an operating element for selecting any one of high-speed dubbing and standard-speed dubbing; a judging element which, if the operating element selects high-speed dubbing of a given program held on the first storage medium, then judges whether the clocked time regarding the program in question exceeds a predetermined time period; a controlling element for permitting high-speed dubbing if the judging element judges the clocked time regarding the program in question to have exceeded the predetermined time period, the controlling element further inhibiting high-speed dubbing if the judging element judges the clocked time regarding the program in question not to have exceeded the predetermined time period; and a displaying element for indicating that high-speed dubbing is inhibited when the judging element has judged the clocked time regarding the program in question not to have exceeded the predetermined time period.

According to another aspect of the invention, there is provided a dubbing method for inhibiting high-speed dubbing for a first predetermined time period if, at a time of high-speed dubbing of a program from a first storage medium onto a second storage medium over a period shorter than an actual playback time, the first storage medium is found to have been subjected to high-speed dubbing earlier by a second predetermined time period, the dubbing method comprising the steps of: firstly judging whether high-speed dubbing of the program in question from the first storage medium onto the second storage medium is designated; if high-speed dubbing of the program from the first storage medium onto the second storage medium is judged designated in the first judging step, then secondly judging whether the program held on the first storage medium was subjected to high-speed dubbing the second predetermined time period earlier; if the program held on the first storage medium is judged in the second judging step to have been subjected to high-speed dubbing the second predetermined time period earlier, then inhibiting high-speed dubbing of the program over the first predetermined time period; and indicating that high-speed dubbing of the program is being inhibited.

Other objects, features and advantages of the invention will become more apparent upon a reading of the following description and appended drawings.

BRIEF DESCRIPTION OF THE DRAWINGS

FIG. 1 is a block diagram of a dubbing apparatus embodying this invention;

FIG. 2A is a schematic view of a data structure for explaining clusters as units of recording on an MD used as a recordable medium;

FIG. 2B is a schematic view of a data structure for explaining sectors constituting each cluster;

FIG. 2C is a schematic view of a data structure for explaining a sound group;

FIG. 2D is a schematic view of another data structure for explaining the sound group;

FIG. 2E is a schematic view of another data structure for explaining the sound group;

FIG. 3 is a schematic view of a data structure in U-TOC sector 0 on an MD used as a recordable medium, the sector containing MD management information;

FIG. 5 is a schematic view of a frame structure comprising data stored on a CD used as a read-only medium;

FIG. 6A is a schematic view of a block structure comprising data stored on a CD used as a read-only medium;

FIG. 6B is a schematic view of a Q channel data structure in sub-code information recorded on the CD;

FIG. 8 is a tabular view listing typical table content information recorded in the lead-in area of a CD used as a read-only medium;

FIG. 10 is a code table listing codes for expressing alphanumeric characters;

DETAILED DESCRIPTION OF THE PREFERRED EMBODIMENTS

Figure 4:
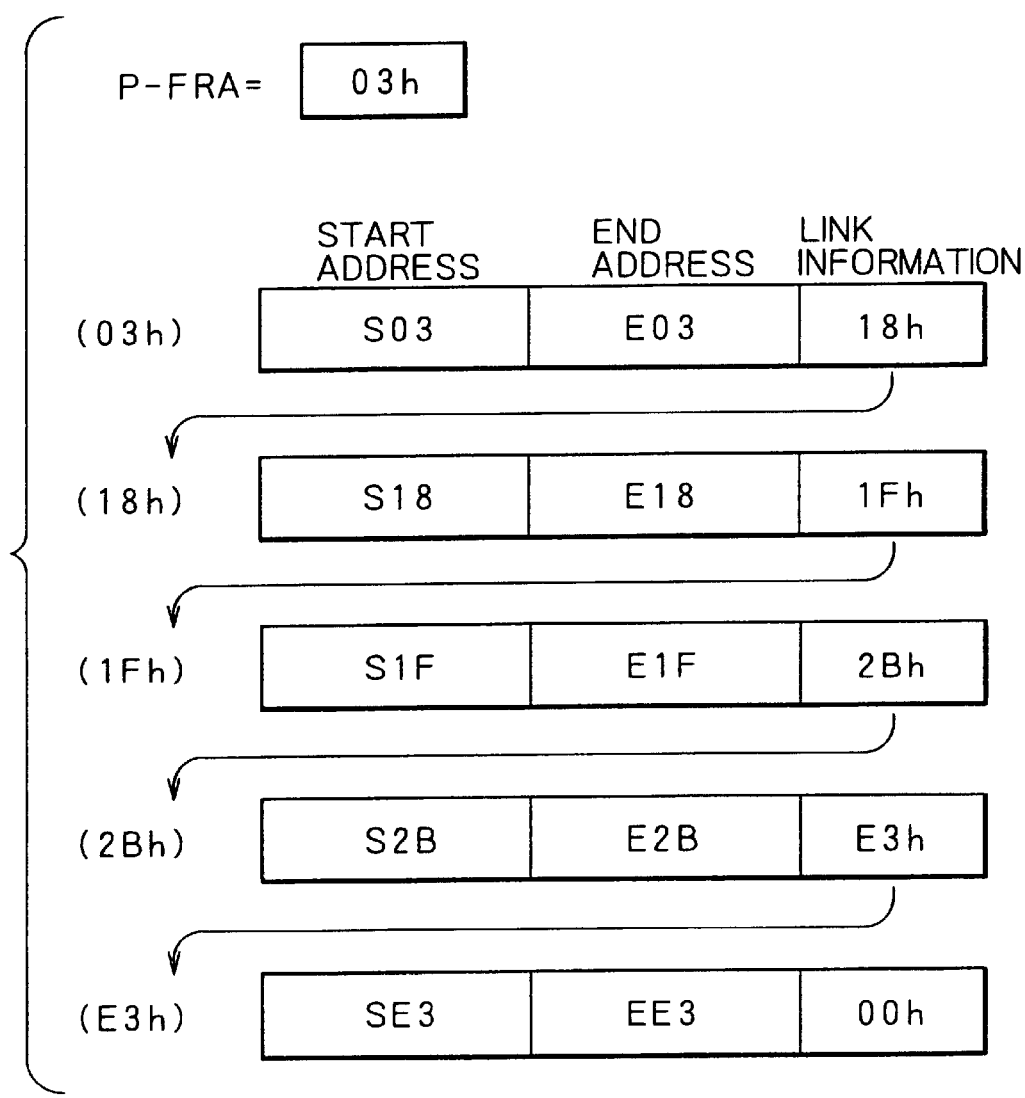
FIG. 4 is a schematic view depicting how discrete recordable areas are linked one another on an MD used as a recording medium.

Preferred embodiments of this invention will now be described by referring to the accompanying drawings. One typical dubbing apparatus described below as embodying the invention is a recording and reproducing apparatus offered as a CD/MD composite apparatus which reproduces data from CDs as well as writes and reads data to and from MDs and which is capable of recording audio data reproduced from a CD onto an MD in what is known as a dubbing process.

The description of how the invention is typically embodied will be given under the following headings:

1. Structure of the Dubbing Apparatus
2. MD Track Format
3. U-TOC
4. Sub-code and TOC of the CD
5. Operations of HCMS Management by the Embodiment
   5-1. Examples of HCMS Management Status Display
   5-2. Operations of HCMS Management
6. Variations of HCMS Management Status Display 1. Structure of the Dubbing Apparatus Described below with reference to FIG. 1 is a typical structure of an MD/CD composite apparatus serving as a dubbing apparatus embodying the invention. In FIG. 1, an MD 90 (magneto-optical disc) is loaded into an MD unit that writes and reads data to and from the MD.

The MD is used as a recordable medium for accommodating audio data. During recording and reproduction of data, the MD 90 is driven rotatively by a spindle motor 2.

An optical head 3 emits a laser beam onto the MD 90, i.e., a magneto-optical disc, for recording and reproduction of data. More specifically, at the time of recording, the optical head 3 outputs a high-level laser beam to the disc to heat its recording tracks to the Curie temperature; at the timing of data reproduction, the optical head 3 outputs a laser beam of a relatively low level to detect data through the magnetic Kerr effect from light reflected by the disc.

In order to accomplish such functions, the optical head 3 has optics comprising a laser diode, a polarization beam splitter and an objective lens 3a, as well as a detector for detecting the reflected light. The objective lens 3a is retained by a dual-axis mechanism 4 in such a manner that the lens travels radially over the disc surface and moves close thereto and away therefrom. The optical head 3 as a whole is moved in the radial direction of the MD 90 by a sled mechanism 5.

A magnetic head 6a is positioned in symmetric relation to the optical head 3 across the MD 90. The magnetic head 6a applies to the MD 90 a magnetic field modulated by supplied data. The magnetic head 6a, along with the optical head 3, is moved in the radial direction of the disc by the sled mechanism 5.

During reproduction, information detected from the MD 90 by the optical head 3 is fed to an RF amplifier 7. By operating on the supplied information, the RF amplifier 7 extracts therefrom a reproduced RF signal, a tracking error signal, a focus error signal, and groove information (absolute location information recorded as wobbling patterns in grooves constituting the recording tracks of the MD 90). The reproduced RF signal thus extracted is supplied to an EFM/CIRC encoder-decoder 8.

The tracking error signal and focus error signal are fed to a servo circuit 9, and the groove information is sent to an address decoder 10 for demodulation. Address information is extracted from the groove information. The address information and sub-code information are recorded as data and are decoded by the EFM/CIRC encoder-decoder 8. These kinds of information are supplied to an MD controller 11 comprising a microcomputer and are used for diverse control purposes. The MD controller 11 carries out various control operations of MD-related components making up an MD section.

The servo circuit 9 generates various servo drive signals based on the supplied tracking error signal and focus error signal, on a track jump command and an access command from the MD controller 11, and on detected rotating speed information from the spindle motor 2. The servo drive signals thus generated are used to control the dual-axis mechanism 4 and sled mechanism 5 for focusing and tracking control and to keep the spindle motor 2 at a constant linear velocity (CLV).

The reproduced RF signal is fed to the EFM/CIRC encoder-decoder 8 for EFM (eight to fourteen modulation) demodulation and for CIRC (cross interleave Reed-Solomon coding-decoding), before being written temporarily to a buffer memory 13 by a memory controller 12. The reading of data from the MD 90 by the optical head 3 and the transfer of reproduced data from the optical head 3 to the buffer memory 13 are effected at 1.41 megabits per second on an intermittent basis.

The reproduced data written to the buffer memory 13 are read therefrom at a transfer rate of 0.3 megabits per second and sent to an audio data compression/decompression encoder-decoder 14 for reproduced signal processing including decompression of audio data. Resulting from the processing are digital audio data sampled at 44.1 kHz through 16-bit quantization. The data are converted to analog signals by a D/A converter 15 before being fed to a terminal TMD of a switching circuit 50.

During a reproducing operation of the MD 90, the switching circuit 50 is connected to the terminal TMD by a system controller 21 controlling performance of the apparatus as a whole. Reproduced audio signals output by the audio data compression/decompression encoder-decoder 14 and converted to analog format by the D/A converter 15 are sent through the switching circuit 50 to a volume adjusting unit 51 and a power amplifier 52. The analog signals are eventually output from speakers 53 as reproduced audio signals.

Writing and reading of data to and from the buffer memory 13 is controlled by the memory controller 12 designating addresses in a write pointer and a read pointer. Because there is the above-mentioned difference in bit rate between writing and reading of data, the buffer memory 13 retains a certain amount of data at all times.

Since reproduced audio signals are output through the intervention of the buffer memory 13, a tracking error caused illustratively by external disturbance may be corrected without interrupting the reproduced audio output in progress. That is, a previous correct tracking position still retained in the buffer memory 13 is accessed so as to resume data retrieval form that position. This reinforces an anti-vibration feature of the apparatus permitting continuous data reproduction without affecting the audio output.

A digital interface 54 is provided in this recording and reproducing apparatus. Data reproduced and decoded by the audio data compression/decompression encoder-decoder 14 at the time of reproduction are also forwarded to the digital interface 54. The reproduced data are encoded by the digital interface 54, also using sub-code information extracted concurrently during reproduction, into a data stream of a predetermined digital interface format for output from a digital output terminal 56 illustratively as an optical digital signal. That is, the reproduced data are output as digital data to an external device.

For a recording operation on the MD 90, analog audio signals fed to an analog input terminal 17 are converted by an A/D converter 18 into digital audio signals sampled at 44.1 kHz through 16-bit quantization. The resulting signals are sent to the audio data compression/decompression encoder-decoder 14 for compression of the data to about one fifth of the original quantity in an audio data compression and encoding process.

Data that are received through the digital interface 54 may also be recorded to the MD 90. Specifically, signals in compliance with the digital interface format and fed from an external device to a digital input terminal 55 are decoded by the digital interface 54, whereby digital audio data and sub-code are extracted. At this point, control information such as the sub-code is supplied to the system controller 21 whereas digital audio data sampled at 44.1 kHz through 16-bit quantization are sent to the audio data compression/decompression encoder-decoder 14 for data compression to about one fifth of the original quantity in the audio data compression and encoding process.

It is also possible to record onto the MD 90 digital audio data that are reproduced from a CD 91 by a CD section, to be described later. In this case, reproduced data "cdg" as digital audio data from the CD 91 are output by an EFM/CIRC decoder 37 after being sampled at 44.1 kHz through 16-bit quantization. The CD-reproduced data "cdg" are sent to the audio data compression/decompression encoder-decoder 14 for data compression to about one fifth of the original quantity in the audio data compression and encoding process.

A digital input PLL circuit 58 admits either digital audio data coming through the digital interface 54 or the CD-reproduced data "cdg" from the CD section, to be described later. In so doing, the digital input PLL circuit 58 generates a clock signal CLK.M in synchronism with synchronizing signals inserted in the input audio data. The clock signal CLK.M may be one having a frequency that is a multiple of, say, 44.1 kHz (=fs).

The clock signal CLM.M is divided or multiplied for conversion into a necessary frequency. Upon recording of data that are digitally input to the MD section, the clock signal thus converted is used at least by the audio data compression/decompression encoder-decoder 14 for internal signal processing and I/O data transfer.

Write data ready for recording after compression by the audio data compression/decompression encoder-decoder 14 are written temporarily to the buffer memory 13 by the memory controller 12 and retrieved therefrom in a suitably timed manner for transfer to the EFM/CIRC encoder-decoder 8. After undergoing CIRC encoding and EFM processes by the EFM/CIRC encoder-decoder 8, the data are supplied to a magnetic head driving circuit 6.

Given the encoded write data, the magnetic head driving circuit 6 feeds a magnetic head drive signal to the magnetic head 6a, driving the latter for N-pole or S-pole magnetic field application to the MD 90. At this point, the MD controller 11 supplies control signals to the optical head 3 causing it to emit a recording-level laser beam.

In order to write or read data to or from the MD 90, it is necessary to retrieve from the MD 90 management information, i.e., P-TOC (pre-mastered table of contents) and U-TOC (user TOC). Based on such management information, the MD controller 11 identifies addresses of those areas of the MD 90 to or from which to record or read data. The retrieved management information is held in the buffer memory 13. The buffer memory 13 has its areas divided into a buffer area for accommodating the above-mentioned write data or read data, and an area for retaining the management information.

When the MD 90 is loaded, the MD controller 11 reads its management information by reproducing data from the radially innermost region of the loaded disc. The management information thus read is retained in the buffer memory 13 and is later referenced as needed during recording or reproducing operations on the MD 90 in question.

The U-TOC is to be edited and updated when data are recorded or deleted. Every time a recording or erasing operation is performed, the MD controller 11 updates U-TOC information held in the buffer memory 13. The updates in the U-TOC information in the buffer memory 13 are also reflected in a suitably timed manner in the U-TOC area on the MD 90.

This recording and reproducing apparatus also includes a group of components for CD data reproduction constituting the CD section. The CD 91, i.e., a read-only optical disc, is loaded into the CD section designed for CD playback.

During CD data reproduction, the CD 91 is driven rotatively by a spindle motor 31 at a constant linear velocity (CLV) An optical head 32 reads data from pits on the CD 91 and supplies the data thus retrieved to an RF amplifier 35. In the optical head 32, an objective lens 32a is supported by a dual-axis mechanism 33 so as to be moved in both tracking and focusing directions. The optical head 32 is driven in the radial direction of the CD 91 by a sled mechanism 34.

The RF amplifier 35 generates not only a reproduced RF signal but also a focus error signal and a tracking error signal. The error signals are supplied to a servo circuit 36.

The servo circuit 36 generates such drive signals as a focus drive signal, a tracking drive signal, a sled drive signal and a spindle drive signal based on the focus error signal and tracking error signal. The drive signals thus generated are used to control the dual-axis mechanism 33, sled mechanism 34, and spindle motor 31 in operation.

The reproduced RF signal is sent to the EFM/CIRC decoder 37. In turn, the EFM/CIRC decoder 37 converts the input reproduced RF signal into binary format to obtain an EFM signal. The EFM signal is subjected to EFM demodulation and CIRC decoding so that the information from the CD 91 is converted to digital audio data sampled at 44.1 kHz through 16-bit quantization.

The EFM/CIRC decoder 37 is also capable of extracting such control data as TOC (table of contents) and sub-code. These control data, when extracted, are supplied to the system controller 21 for various control operations.

The EFM signal acquired by the EFM/CIRC decoder 37 through binarization is also forwarded to a PLL circuit 39. The PLL circuit 39 outputs a clock signal PLCK in synchronism with channel bits in the input EFM signal. At the standard speed, the clock signal PLCK is set to have a frequency of 4.3218 MHz. The clock PLCK is used illustratively by signal processing circuits downstream of the decoder 37.

Digital audio data from the EFM/CIRC decoder 37 are converted to analog audio signals by a D/A converter 38 before being fed to a terminal TCD of the switching circuit 50. During CD data reproduction, the system controller 21 sets the switching circuit 50 to the terminal TCD. Through the terminal thus selected, the audio signals reproduced from the CD 91 and converted to analog audio signals by the D/A converter 38 are supplied to the volume adjusting unit 51 and power amplifier 52. The analog signals are then output from the speakers 53 as reproduced audio signals.

This embodiment allows CD-reproduced data to be dubbed onto the MD 90. In that case, the digital audio data output by the EFM/CIRC decoder 37 are sent unmodified to the audio data compression/decompression encoder-decoder 14.

The digital audio data output by the EFM/CIRC decoder 37 are also forwarded to the digital interface 54. From there, the data may be output through the digital output terminal 56 to an external device as CD-reproduced data "cdg" in digital format.

Upon data reproduction from the CD 91, it is necessary to read its management information, i.e., its TOC. In accordance with the management information thus retrieved, the system controller 21 recognizes the number of tracks on the CD 91 and addresses of the tracks for control over the reproducing operation. When the CD 91 is loaded, the system controller 21 reproduces TOC from the radially innermost region of the loaded disc. The retrieved data are retained illustratively in an internal RAM 21a and are later referenced as needed during data reproduction from the CD 91 in question.

The system controller 21 is a microcomputer that controls the apparatus as a whole. The system controller 21 gives various commands to the MD controller 11 causing the latter to control performance of the MD section. During recording or reproduction of data to or from the MD 90, the system controller 21 receives management information such as sub-code from the MD controller 11.

The CD section is illustratively under direct control of the system controller 21. The RAM 21a inside the system controller 21 serves as a memory that temporarily accommodates various kinds of information needed by the system controller 21 to carry out its processes.

With this embodiment, the system controller 21 outputs illustratively a clock signal CLK acquired on the side of the CD section (a clock signal having a frequency obtained illustratively on the basis of the clock PLCK), various data (indicated as DATA in FIG. 1), and commands (indicated as COMMAND) for giving various orders to the MD controller 11 during a reproducing operation of the CD section. The data above include such information as TOC and sub-code obtained at the time of CD data reproduction.

In this embodiment, the system controller 21 is furnished with an HCMS management table 22 and a timer unit 23. The two components are used for HCMS management purposes.

The HCMS management table 22 may illustratively be made of a nonvolatile memory such as an EEPROM (electrically erasable and programmable read-only memory) or a flash RAM. The use of a memory device such as an EEPROM constituting the HCMS management table 22 makes it possible illustratively to store track numbers and timer times clocked regarding the stored tracks. Track numbers may be entered into the table 22 in a manner that will be described later. Illustratively, if the dubbing apparatus is reset or switched off, the HCMS management table 22 allows the contents stored so far to be retained. Where a RAM is to constitute the HCMS management table 22, the RAM 21a inside the system controller 21 may have part of its areas allocated for use as the table.

Execution of HCMS management by use of the HCMS management table 22 and timer unit 23 will be described later. In this specification, HCMS management refers to a set of information management and performance control operations for implementing dubbing restrictions according to relevant HCMS provisions.

The control system outlined above may be replaced illustratively by a CD controller dedicated to controlling the CD section. As another alternative, the system controller 21 and MD controller 11 may be structurally integrated.

An operation unit 19 allows the user to operate a recording key, a playback key, a stop key, an AMS (audio music sensor) key, a search key, and a dubbing key (for setting standard-speed or high-speed dubbing) furnished on the unit. With these keys, the operation unit 19 allows the user to perform the reproducing and recording operations regarding the MD 90 and CD 91. The operation unit 19 also makes it possible to enter character strings with which to record supplementary data such as track names onto the MD 90, as well as to finalize the entries and carry out entry mode operations.

Operation information from the operation unit 19 is supplied to the system controller 21. Based on the operation information thus furnished and on its operation programs, the system controller 21 performs necessary processes regarding various components of the apparatus.

Although not shown, an infrared-ray remote commander may be optionally added to the operation unit 19 as a remote control function.

The display unit 20 provides relevant displays at the time of reproducing and recording operations of the MD 90 and CD 91. For example, under control of the system controller 21, the display unit 20 displays time information such as a total playing time and playback or recording progress status, track numbers, operating status, and current operation mode.

The recording and reproducing apparatus of the above-described structure embodying the invention is capable of four major types of operations: reproduction of data from an MD, recording of data to an MD, reproduction of data from a CD, and dubbing from a CD to an MD.

The embodiment permits two types of CD-to-MD dubbing: standard-speed dubbing and high-speed dubbing. High-speed dubbing may involve recording data at a speed multiplying the standard speed by a predetermined number N (a natural number greater than 1), as follows:

The servo circuit 36 in the CD section drives the spindle motor 31 by setting up a CLV that is N times as fast as the standard speed. It is in this state that data are reproduced from the CD 91. The PLL circuit 39 establishes a PLL target value of N×4.3218 (=8.6436 MHz; a clock frequency N times as high as that of the standard speed) to lock the phase at the N-fold speed. The target value of the PLL circuit 39 is switched under control of the system controller 21.

With the PLL circuit 39 in its locked state, the CD 91 is controlled stably at an N-fold CLV. At the same time, the EFM/CIRC decoder 37 and D/A converter 38 perform normal signal processing at the N-fold speed.

With the processing carried out at the N-fold speed, CD-reproduced data "cdg" (with a sampling frequency of 88.2 kHz (=44.1×N) quantized in 16 bits) having a transfer rate N times as high as that of the standard speed are transmitted to the encoder-decoder 14 of the MD section.

The CD-reproduced data "cdg" having the N-fold transfer rate are also input to the digital input PLL circuit 58. The PLL circuit 58 establishes a PLL target value to lock the phase at a channel clock frequency that is N times that of the standard speed. The target value of the PLL circuit 58 is switched illustratively under control of the MD controller 11 in response to commands from the system controller 21.

With the digital input PLL circuit 58 in its locked state, a frequency N times that of the standard speed is obtained as the clock CLK.M. In synchronism with the clock CLK.M, the audio data compression/decompression encoder-decoder 14 illustratively performs signal compression, transfers data to the memory controller 12, and writes data to the buffer memory 13. These actions provide a recording signal process synchronized with the CD-reproduced data "cdg" having the N-fold transfer rate and coming from the CD section.

Writing of data from the buffer memory 13 to the EFM/CIRC encoder-decoder 8, processing of signals by the encoder-decoder 8, and recording of data to the MD 90 are all performed in synchronism with the master clock provided by the MD controller 11 or with a clock signal acquired during controlled revolutions using wobbling patterns on the MD as needed.

As evident from the above explanation of the MD section, data are read for a recording operation from the buffer memory 13 at a speed higher than the speed at which data are written to the memory 13. As a result, data are recorded intermittently to the MD 90. That is, whenever a certain amount of data has been accumulated in the buffer memory 13, the accumulated data are written to the MD 90; every time a data write operation reduces the data quantity below a predetermined level or down to zero in the buffer memory 13, the MD section waits for data to be accumulated in the memory 13 up to a level permitting another write operation; and the process is repeated.

In that case, it is not mandatory to establish an elevated speed corresponding to the N-fold speed at which data are reproduced by the CD section; the established speed serves as a rotating speed at which the MD 90 is driven rotatively during N-fold speed dubbing or as a transfer rate and a signal processing speed for transferring I/O data to and from the EFM/CIRC encoder-decoder 8.

In other words, even if the MD 90 is rotated at the standard speed, and the rate of I/O data transfer to and from the EFM/CIRC encoder-decoder 8 and its signal processing speed are set to be commensurate with the standard speed, data are still recorded correctly to the MD 90. The data recording is accomplished simply by making pause periods in writing data to the MD 90 shorter than those at the standard speed, or by writing data continuously and not on an intermittent basis.

Depending on such conditions as the capacity of the buffer memory 13, it is possible alternatively to set the speed at which the MD 90 is rotated, the rate of I/O data transfer to and from the EFM/CIRC encoder-decoder 8, and the signal processing speed of the encoder-decoder 8 to be commensurate with an elevated speed multiplying the standard speed by a predetermined number.

2. MD Track Format

What follows is a description of a cluster format of recording data tracks on the magneto-optical disc (MD) 90. Data are recorded by a Mini-disc system in units called clusters. A typical format of clusters is shown in FIGS. 2A through 2E.

As depicted in FIG. 2A, clusters CL are formed consecutively as recording tracks on the MD. One cluster is the smallest increment of data to be recorded. Each cluster generally corresponds to two or three tracks.

As shown in FIG. 2B, a cluster CL is constituted by a four-sector sub-data area made of sectors SFC through SFF and by a 32-sector main data area composed of sectors S00 through S1F. For audio-related usage, the main data refer to compressed audio data derived from the ATRAC (Adaptive Acoustic Transform Coding) process described above. As indicated in FIG. 2C, a sector is a data unit composed of 2,352 bytes.

The four-sector sub-data area is used to accommodate sub-data and serves as a linking area. TOC data and audio data are recorded to the 32-sector main data area. The sectors in the linking area are dummy sectors justifying a surfeit of the interleaving length based on CIRC (adopted for this embodiment) compared with the sector length (13.3 msec) utilized by CD and other systems for error correction. As such, the linking area is basically a reserved area, although the sectors composing the area may also be used for some processes or for the recording of some control data. An address is recorded to each sector.

As shown in FIG. 2D, each sector is further divided into smaller units called sound groups. Specifically, two sectors are divided into 11 sound groups.

As illustrated in FIGS. 2C and 2D, a pair of contiguous two even-numbered and odd-numbered sectors (e.g., sector S00 and S01) contain sound groups SG00 through SG0A.

Each sound group is constituted by 424 bytes and provides compressed digital audio data corresponding to a time period of 11.61 msec.

Within each sound group SG, data are recorded on two separate channels: left (L) channel and right (R) channel, as shown in FIG. 2E. Illustratively, the sound group SG00 is composed of L channel data L0 and R channel data R0; the sound group SG01 is made of L channel data L1 and R channel data R1. A data area accommodating the L or R channel data has 212 bytes that are called a sound frame.

3. U-TOC

The surface of the magneto-optical disc (MD) 90 is covered with clusters whose format is shown in FIG. 2A. One of radially divided areas on the radially innermost side is set aside as a management area. A program area is located outside the management area.

The management area is made up of a read-only area and an innermost portion of a magneto-optical area. The read-only area located on the radially innermost side accommodates read-only data recorded in phase pits. Located outside the read-only area, the magneto-optical area allows data to be written thereto and read therefrom on a magneto-optical basis.

Outside the management area of the magneto-optical area is the program area. In the program area, audio data are recorded to each of the sectors constituting the main data area furnished as a recordable user area.

In the management area, the read-only area has P-TOC for area management regarding the disc as a whole. In the magneto-optical area outside the read-only area, content information (U-TOC or user table of contents) is recorded for management of programs recorded in the program area.

Described below are U-TOC sectors accommodating management information used to write or read track data to or from the MD 90. FIG. 3 shows a format of U-TOC sector 0. Sectors 0 through 31 may be allocated as U-TOC sectors. That is, each of the sectors (S00 through S1F) in one cluster of the management area may be used. Sectors 1 and 4 hold text information while sector 2 accommodates recording time-of-day information.

U-TOC sector 0 is a data area that contains management information about pieces of music recorded by the user and about recordable (i.e., free) areas. More specifically, sector 0 accommodates a start and an end address of each of the programs recorded in the program area, as well as copy protect information illustratively as a mode of each program, and emphasis information.

For example, when a piece of music is to be recorded to a disc 1, the system controller 11 searches U-TOC sector 0 for a free area on the disc and writes digital audio data to the area thus found out. At the time of reading a piece of music from the disc for playback, the system controller searches U-TOC sector 0 for the area where the target piece of music is stored, gains access to that area, and retrieves the data from the accessed area.

As shown in FIG. 3, U-TOC sector 0 has a header in which a 12-bit sync pattern is formed, followed by three-byte data representing addresses of the sector in question (Cluster H, Cluster L, SECTOR), a maker code identifying the relevant disc manufacturer, a model code indicating a disc model, a first program number (First TNO), a last program number (Last TNO), sector usage status (used sectors), a disc serial number, and a disc ID.

Also recorded in sector 0 is a corresponding table designating data portion comprising: a pointer P-DFA (pointer for defective area) designating the start position of a slot in which to store information about a defective area on the disc;

a pointer P-EMPTY (pointer for empty slot) specifying slot use status; a pointer P-FRA (pointer for free area) indicating the start position of a recordable area; and pointers P-TNO1, P-TNO2, . . . , P-TNO255 pointing to the start position of each of the slots corresponding to program numbers.

The corresponding table designating data portion is followed by a management table having 255 slots of eight bytes each. Each slot is used to manage a start address, an end address, a track mode, and link information.

With this embodiment, data need not be recorded in a continuous fashion on the magneto-optical disc 90; a sequential data string may be divided into a plurality of discrete data parts when recorded. A data part signifies a temporally continuous set of data recorded in physically contiguous clusters.

In the recording and reproducing apparatus (MD section in FIG. 1) adapted to the disc 90, data are accumulated temporarily in the buffer memory 13 to absorb different rates at which data are written to and read from the buffer memory 13. The optical head 3 is driven to access successively the data that are recorded in a distributed fashion on the disc 90, with the retrieved data accumulated in the buffer memory 13. In the buffer memory 13, the data are restored back into the original sequential data string for reproduction.

In the above structure, the rate of writing data to the buffer memory 13 for reproduction is higher than the rate of reading data therefrom. This ensures that continuous audio data playback will not be disrupted.

If a program is written over an already recorded program and if the newly written program is shorter than the existing program, the excess portion of the latter is left undeleted and designated instead as a recordable area that is managed by pointer P-FRA. This arrangement permits efficient utilization of the recordable capacity.

Described below with reference to FIG. 4 is how dispersed areas are linked by use of the pointer P-FRA for managing recordable areas.

Suppose that a value of 03h (hexadecimal) is recorded to the pointer P-FRA pointing to the start position of a slot for managing a recordable area. In that case, the slot corresponding to the value "03h" is accessed, and data are read from the slot 03h in the management table.

The start and end address data held in the slot 03h designate a start and an end point of one data part recorded on the disc. Link information held in the slot 03h indicates the address of the slot that follows the slot 03h. In this example, the link information holds a value of 18h.

Link information contained in the slot 18h points to a slot 1Fh. The slot 1Fh is accessed in order to find a start and an end address designating a start and an end point of another data part recorded on the disc.

The link information is tracked likewise until the value 00h signifying the end of the link is encountered. The process makes it possible to acquire the addresses of all data parts managed by means of the pointer P-FRA.

In the manner described, the slots are traced starting from the first slot designated by the pointer P-FRA until the link information becomes null (=00h). The process links within memory space the data parts that were separately recorded on the disc. It is thus possible to grasp all data parts as recordable areas on the disc 90.

Whereas the pointer P-FRA was explained above as a representative example, other pointers P-DFA, P-EMPTY, P-TNO1, P-TNO2, . . . , P-TNO255 may also be used likewise in the management process linking dispersed data parts.

4. Sub-code and TOC of the CD

A TOC and a sub-code recorded on the CD 91 will now be described. The TOC is written in what is known as a lead-in area. The sub-code is inserted into data in a way that will be described later.

In the CD system, a single unit of recorded data constitutes one frame, and 98 frames make up one block. A typical structure of the frame is shown in FIG. 5.

One frame is composed of 588 bits: the first 24 bits constitute synchronizing data and the next 14 bits a sub-code data area, followed by data and parity bits.

One block is made up of 98 frames each having the above structure. Sub-code data extracted from the 98 frames are arranged into single-block sub-code data depicted in FIG. 6A.

Of the 98 frames, the first and the second frame (frames $98n+1$ and $98n+2$) yield sub-code data that form synchronizing patterns (sync patterns). The third through the 98th frame (frames $98n+3$ through $98n+98$) each constitute 96-bit channel data, i.e., sub-code data P, Q, R, S, T, U, V and W.

The P and Q channel data are used for access management. Specifically, the P channel represents pauses between tracks whereas the Q channel (bits Q1 through Q96) permits more sophisticated controls. On the CD, the 96-bit Q channel data are structured as illustrated in FIG. 6B.

The first four bits Q1 through Q4 in the Q channel data constitute control data that are used to represent the number of audio channels, presence or absence of emphasis, CD-ROM identification, and availability of digital copy.

The next four bits Q5 through Q8 are address bits. They indicate the contents of control bits for sub-Q data.

Bits Q9 through Q80 constitute 72-bit sub-Q data. The remaining bits Q81 through Q96 are used for CRC (cyclic redundancy check).

Figure 7A:
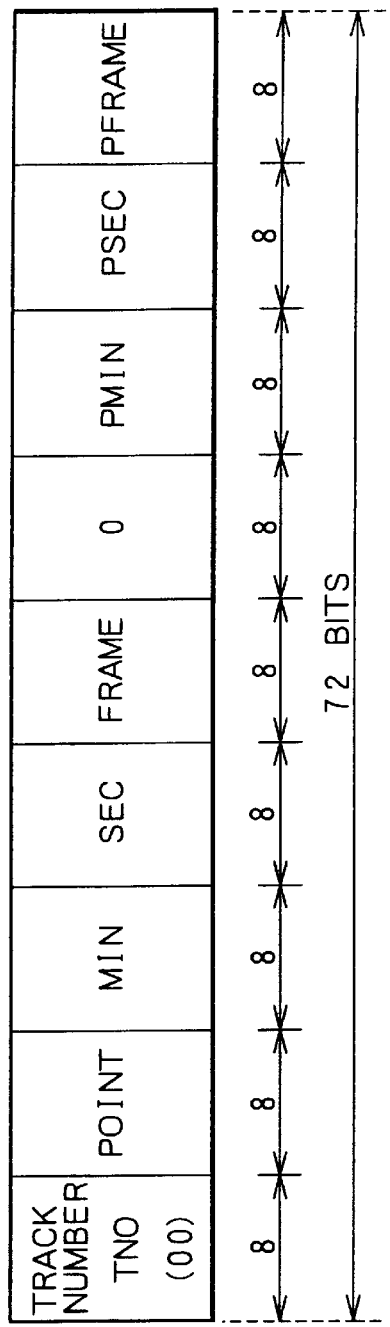
FIG. 7A is a schematic view indicating how the Q channel data shown in FIG. 6B are structured when recorded in a lead-in area.

In the lead-in area, the sub-Q data recorded therein constitute TOC information. The 72-bit sub-Q data of bits Q9 through Q80 making up the Q channel data read from the lead-in area provide information shown in FIG. 7A. The sub-Q data are composed of data items each constituted by eight bits.

A track number is recorded first. In the lead-in area, the track number (TNO) is fixed to "00". The track number is followed by a point (POINT).

Next to the track number is a value of a point that is followed by an entry of an elapsed time within the track of interest in minutes (MIN) and seconds (SEC), followed by a frame number (FRAME).

The frame number is in turn followed by PMIN, PSEC and PFRAME, in that order. These entries have different meanings depending on the value of the point.

When the value of the point ranges from "01" to "99", each value signifies a track number. In such cases, the start point of the track indicated by the track number is recorded in minutes (PMIN) and seconds (PSEC) as well as in terms of a frame number (PFRAME).

When the value of the point is "A0", the track number of the first track is recorded in terms of PMIN. The type of the CD in question is classified as a CD-DA (digital audio), a CD-I or a CD-ROM (XA-compatible) depending on the value of PSEC.

When the value of the point is "A1", the track number of the last track is recorded in terms of PMIN.

When the value of the point is "A2", the start point of the lead-out area is recorded as an absolute time address in terms of PMIN, PSEC and PFRAME.

On a six-track disc, its TOC constituted by sub-Q data is illustratively recorded as shown in FIG. 8. As indicated, all track numbers (TNO) are "00".

A block number represents a block of data made of 98 frames as mentioned above, i.e., a unit of sub-Q data that has been read. Three consecutive blocks are used to describe the same contents of TOC data.

Where the value of the point ranges from "01" to "06" as shown in FIG. 8, the entries PMIN, PSEC and PFRAME denote the start points of tracks #1 through #6.

When the value of the point is "A0", the track number of the first track on the disc in question is indicated as "01" in PMIN. The value of PSEC identifies the disc type. Illustratively, the PSEC value "00" stands for an ordinary audio CD, "20" for a CD-ROM (XA-compatible), and "10" for a CD-I.

At a location where the value of the point is "A1", the entry PMIN accommodates the track number of the last track on the disc. At a location where the value of the point is "A2", the start point of the lead-out area is indicated in terms of PMIN, PSEC and PFRAME.

After block n+27, the contents of the blocks n through n+26 are recorded repeatedly.

Figure 7B:
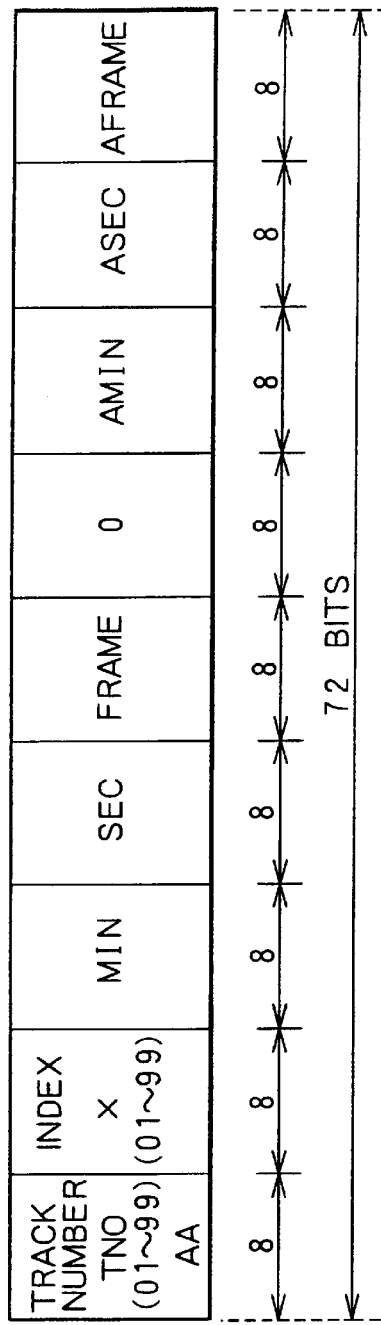
FIG. 7B is a schematic view depicting how the Q channel data shown in FIG. 6B are structured when recorded in a track area and a lead-out area.

In the program area where, say, pieces of music are recorded as tracks #1 through #n, as well as in the lead-out area, the sub-Q data recorded therein comprise information depicted in FIG. 7B.

Recorded at the top is a track number that is one of "01" through "99" for each of tracks #1 through #n. In the lead-out area, the track number is "AA".

Each track number is followed by an index that divides the track in question into smaller portions.

The index is followed by MIN (minutes), SEC (seconds) and FRAME (frame number) indicating an elapsed time within the track of interest.

The elapsed time is followed by an absolute time address recorded in minutes (AMIN), seconds (ASEC) and a frame number (AFRAME).

As is well known, the Q channel data for the CD fall into three modes: mode 1, mode 2 and mode 3. The data contents are different from one mode to another.

Figure 9:
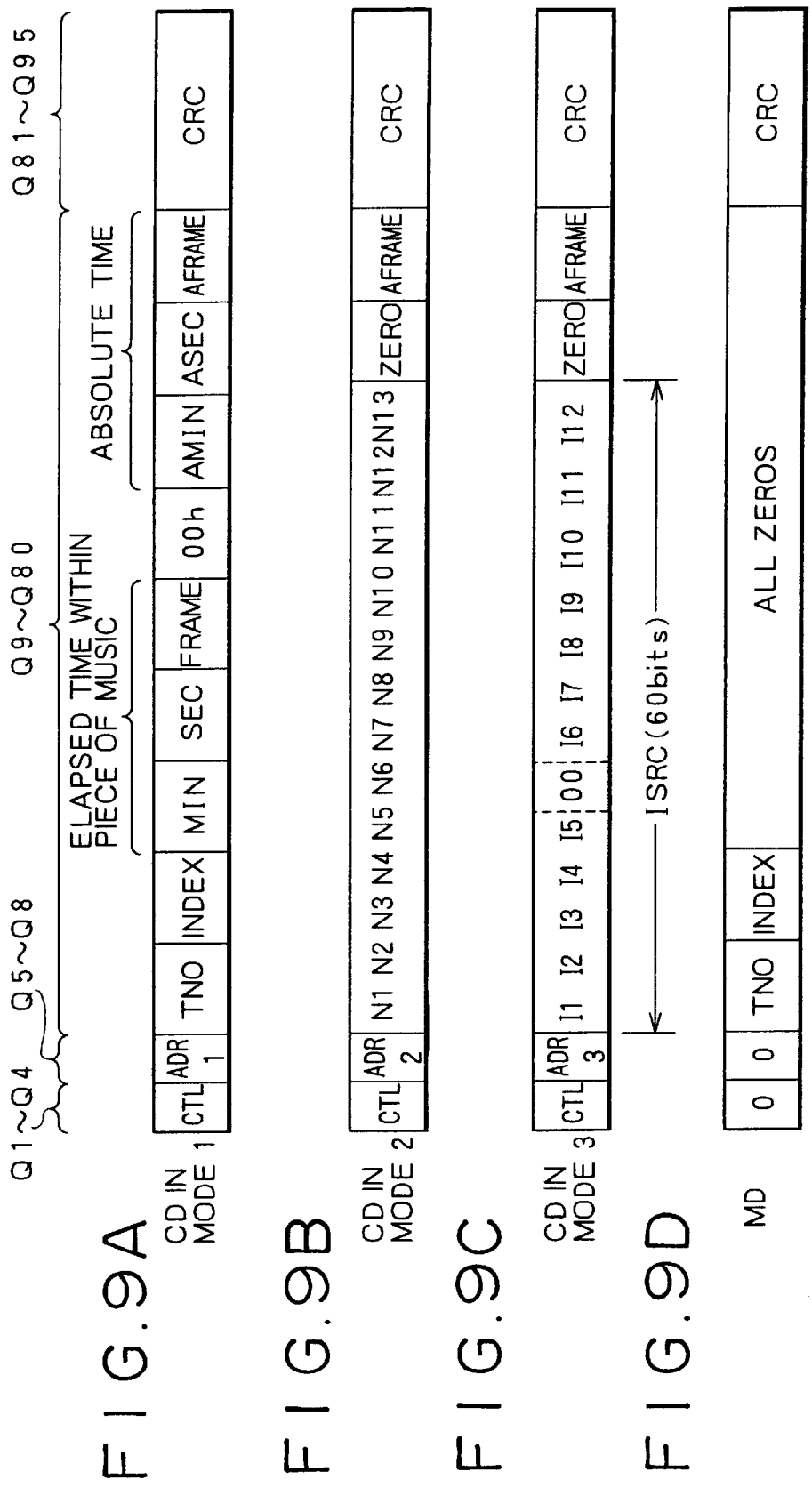
FIG. 9A is a schematic view of a Q channel data structure in mode 1 on a CD as a read-only medium.
FIG. 9B is a schematic view of a Q channel data structure in mode 2 on the CD.
FIG. 9C is a schematic view of a Q channel data structure in mode 3 on the CD.
FIG. 9D is a schematic view of a Q channel data structure on an MD used as a recordable medium.

Below is a description of the Q channel data for the CD classified into mode 1 as shown in FIG. 9A.

In FIG. 9A, the first four bits Q1 through Q4 in the Q channel data constitute control data CTL that are used to represent the number of audio channels, presence or absence of emphasis, and CD-ROM identification.

The four-bit control data are defined as follows:

| | |
|---|---|
| "0***" | two-channel audio |
| "1***" | four-channel audio |
| "*0**" | CD-DA (CD digital audio) |
| "*1**" | CD-ROM |
| "**0*" | digital copy prohibited |
| "**1*" | digital copy permitted |
| "***0" | pre-emphasis not provided |
| "***1" | pre-emphasis provided |

The control data CTL have their bits set as required for each specific CD. This holds true for the control data CTL (bits Q1 through Q4) among the Q channel data in modes 2 and 3, to be described later.

The next four bits Q5 through Q8 are address bits ADR. They are used as control bits for data bits Q9 through Q80. When the four address bits are "0001" ("1" in decimal notation), they signify that the next bits Q9 through Q80 make up sub-Q data for an audio CD in mode 1. The 72 bits Q9 through Q80 are used as the sub-Q data while the remaining bits Q81 through Q96 are used for CRC.

The 72 bits Q9 through Q80 as sub-code contents carry information divided in units of eight bits, as shown in FIG. 9A. Recorded at the top is a track number (TNO) that is one of "01" through "99" for each of tracks #1 through #n. In the lead-out area, the track number is "AA".

The track number is followed by an index (INDEX) that divides the track in question into smaller portions.

The index is then followed by MIN (minutes), SEC (seconds) and FRAME (frame number) indicating an elapsed time within the track of interest.

The elapsed time is followed by an absolute time address recorded in minutes (AMIN) and seconds (ASEC) and in terms of a frame number (AFRAME). An absolute time address is time information which denotes zero minute, zero second and zero frame at the start point of a first track and which is furnished uninterruptedly up to the lead-out area. This provides absolute address information for managing each track on the disc.

FIG. 9B depicts a structure of Q channel data classified as mode 2. In this example, the address ADR (bits Q5 through Q8) of the Q channel data in mode 2 is given as "0010" ("2" in decimal notation). This indicates that the ensuing sub-Q data of bits Q9 through Q80 are data contents of an audio CD in mode 2.

The sub-Q data of bits Q9 through Q80 in mode 2 accommodate 13 digits N1 through N13 (4×13=52 bits). The data N1 through N13 are followed by a zero-bit segment which in turn is followed by an absolute time frame number (AFRAME) and a CRC.

The data N1 through N13 constitute information identifying a product number of the CD in question. The data are typically used for bar coding.

FIG. 9C shows a typical structure of Q channel data classified as mode 3. Under CD-related provisions, the Q channel data in mode 3 are allowed to be inserted once into every consecutive 100 sub-coding blocks at the most.

An address ADR (bits Q5 through Q8) of the Q channel data in mode 3 is given as "10011" ("3" in decimal notation). This address indicates that the ensuing sub-Q data (Q9 through Q80) constitute Q data contents of an audio CD in mode 3.

A sub-Q data area made up of bits Q9 through Q80 in mode 3 accommodates an ISRC (International Standard Recording Code) constituted by 60 bits of data I1 through I12. The ISRC provides information affording a specific number (identifier) to a track carrying a piece of music. Illustratively, the ISRC serves as an international standard code for identifying each piece of music (track) recorded on a CD for copyright management.

The ISRC is followed by a zero-bit segment which in turn is followed by an absolute time frame number (AFRAME) and a CRC.

Of the data I1 through I12 constituting the ISRC, the data I1 through I5 are each made up of six bits. As shown in FIG. 10, values represented by the six bits correspond to characters in a predetermined format. The data I6 through I12 are each composed of four bits that denote characters in BCD format. A two-zero-bit segment is inserted interposingly between the data I1 through I5 on the one hand and the data I6 through I12 on the other hand.

The data I1 and I2 made up of 12 bits constitute a country code. This is a code that identifies country names using any two characters among those defined in FIG. 10.

The data I3 through I5 composed of 18 bits constitute an owner code. The code is capable of identifying as many as 24,480 owners using two alphabetic characters and two alphanumeric characters according to the definitions in FIG. 10.

The eight-bit data I6 and I7, each data item made of four bits, represent a year of recording by two digits in BCD format.

The 20-bit data I8 through I12, each data item composed of four bits, denote a serial number of the recording on the track in question by four digits in BCD format.

The ISRC constituted by the above data is inserted as a sub-code having specific values for each track. This is how the tracks are identified on the CD.

FIG. 9D shows a typical structure of Q channel data for the Mini-disc, explained here for purpose of reference. A track number (TNO), index information (INDEX) and a CRC code are provided on the MD but not time information. The areas corresponding to the control data CTL (bits Q1 through Q4) and address ADR (bits Q5 through Q8) are filled with "0000" each.

5. Operations of HCMS Management by the Embodiment 5-1. Examples of HCMS Management Status Display As described above, the embodiment of the invention permits high-speed dubbing at a predetermined multiple-fold speed. However, as mentioned earlier in connection with conventional devices, there is a possibility that the user may infringe on copyrights if high-speed dubbing of the same CD or the same piece of music (track) is allowed to be done more frequently than is reasonably considered normal for personal use.

In view of such circumstances, the dubbing system embodying the invention is designed to implement copyright protection by imposing constraints on high-speed dubbing in units of a piece of music (track) in accordance with HCMS provisions. That is, the embodiment implements HCMS management.

The HCMS provisions stipulate that any one track illustratively in the form of a piece of music, once dubbed at a high speed, may not be dubbed again at that high speed at least within 74 minutes of the point in time at which the track in question began to be dubbed. Although this stipulation was mentioned earlier, it is repeated here for emphasis.

Typical operations of the embodiment under HCMS management are described below. HCMS management as understood in this context signifies a set of restrictions effected on high-speed dubbing on the basis of the contents in the HCMS management table 22, to be described later.

One operation of HCMS management by this embodiment involves carrying out an "HCMS management status display" indicating the current status of HCMS management of a given track at a given point in time. Examples of such an HCMS management status display are thus described first. The operations of HCMS management including the HCMS management status display will then be described.

FIGS. 11A through 11D show transitions of displays performed on the display unit 20 in response to operations by the user for high-speed dubbing execution. On the display unit 20, the upper half of its display area is indicated as an area A1 (called the upper display area) and the lower half as an area A2 (lower display area).

Figure 11A:
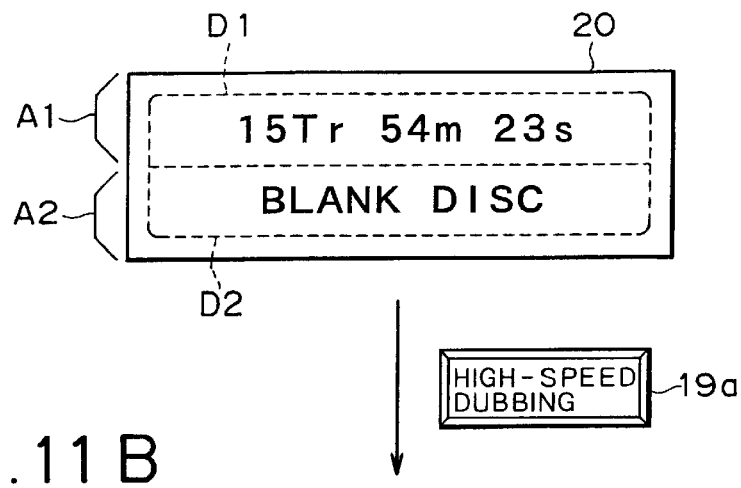
FIG. 11A is a schematic view of a typical display appearing on a display unit before dubbing is started.

FIG. 11A depicts a display on the display unit 20 in effect before dubbing is designated on the dubbing apparatus. The display indicates illustratively that the CD 91 (dubbing source storage medium) and the MD 90 (dubbing destination storage medium) are both loaded and are in a recording/reproduction stopped state each.

In the recording/reproduction stopped state, the display unit 20 gives a CD-ready display D1 in the upper display area A1 and an MD-ready display D2 in the lower display area A2. The displays D1 and D2 reflect current status of the CD and MD sections respectively.

The CD-ready display D1 denotes the total number of tracks on the CD 91 currently in the reproduction stopped state, as well as a total playing time of the CD. A typical indication "15Tr 54 m 23 s" signifies that a total of 15 tracks are recorded on the currently loaded CD 91 in the CD section and that the CD 91 has a total playing time of 54 minutes, 23 seconds.

In principle, the MD-ready display D2 denotes likewise the total number of tracks on the MD 90 currently loaded in the MD section and placed in the reproduction stopped state, as well as a total playing time of the MD. In this example, however, the MD is a blank disc with no audio data recorded as tracks, as indicated by a character string "BLANK DISC".

Suppose now that the user, with the recording/reproduction stopped state in effect, operates a high-speed dubbing key 19a on the operation unit 19 to carry out high-speed dubbing. In response, the dubbing apparatus enters a standby state constituting high-speed dubbing mode. Illustratively, the CD 91 and MD 90 start getting rotated at their respectively elevated speeds in preparation for high-speed dubbing. The CD 91 is then placed in a reproduction pause state and the MD in a recording pause state.

Figure 11B:
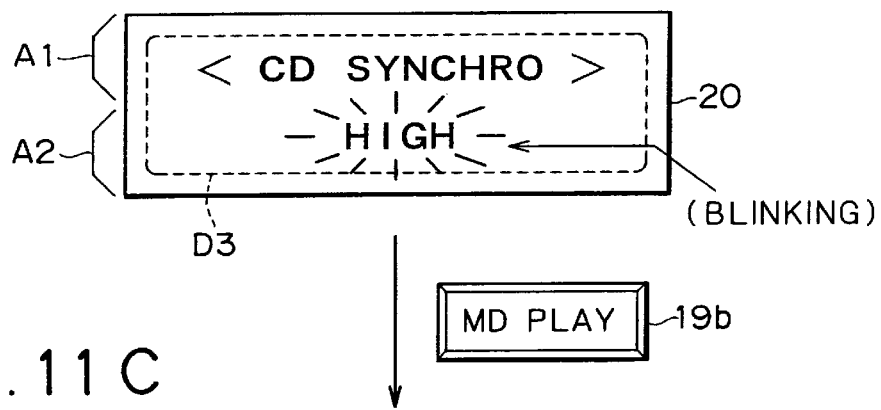
FIG. 11B is a schematic view of a typical display appearing on the display unit while recording is put on hold.

In the recording/reproduction pause state, the display unit 20 provides a high-speed dubbing mode display D3 using its upper and lower display areas A1 and A2 as shown in FIG. 11B.

In the high-speed dubbing mode display D3, the upper display area A1 illustratively indicates <CD SYNCHRO> and the lower display area A2 a blinking character string "HIGH". These indications signify that the CD and MD sections are now in a standby state ready for a synchronized reproduction-recording operation.

In such a high-speed dubbing standby state, the user operates an MD PLAY key 19b. This starts high-speed dubbing.

Figure 11C:
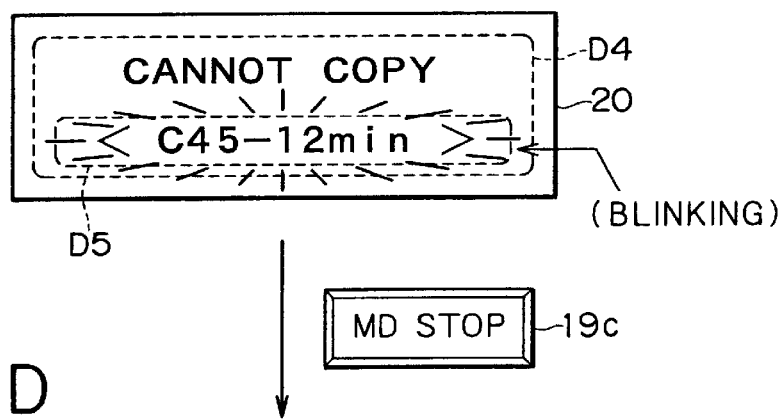
FIG. 11C is a schematic view of a typical display appearing on the display unit while high-speed dubbing is being inhibited.
Figure 11D:
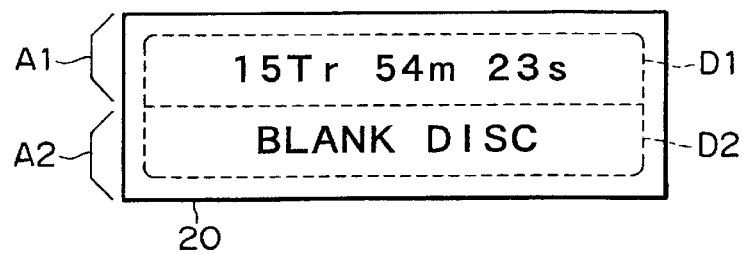
FIG. 11D is a schematic view of a typical display appearing on the display unit after the setting of high-sped dubbing is cleared.

In the case of FIG. 11C, it is assumed that the first track to be reproduced from the CD 91 by a high-speed dubbing starting operation is currently subject to an injunction against high-speed dubbing in compliance with relevant HCMS provisions. That is, the first track has already been recorded by high-speed dubbing within the past 74 minutes.

In that case, this embodiment does not start high-speed dubbing and terminates the dubbing process regardless of the user's operation on the MD PLAY key 19b to initiate high-speed dubbing. The display unit 20 at that point gives a dubbing error display D4 shown in FIG. 11C. This is an HCMS management status display specific to this embodiment.

In the dubbing error display D4, the upper display area A1 indicates "CANNOT COPY", which means that a high-speed dubbing process that should have been started is now canceled. The lower display area A2 provides a blinking indication of an error code denoting the type of the error that caused the cancellation, as well as a parameter applicable to the error code in question.

In the display <C45 -12 min> given by the lower display area A2, characters "C45" constitute the error code. The code indicates that the high-speed dubbing process has been canceled under constraints of HCMS management. In other words, the track desired to be dubbed at high speed has already been recorded by high-speed dubbing within the past 74 minutes, and the injunction against a repeat high-speed dubbing process is still in effect.

As a parameter corresponding to the error code "C45", a character string "-12 min" is illustratively displayed. The parameter indicates the remaining time that must elapse until the next session of high-speed dubbing is permitted for the track whose high-speed dubbing has been rejected. The indication "-12 min" signifies that the next session of high-speed dubbing is allowed to proceed upon elapse of another 12 minutes.

On viewing the dubbing error display D4, the user immediately understands that the track desired to be dubbed is being prevented from high-speed dubbing under HCMS management and that that is the reason the high-speed dubbing starting operation has been canceled.

By further ascertaining the restricted remaining time on display, the user is able to know in how many minutes the next session of high-speed dubbing becomes available for the track of interest.

When the dubbing error display D4 appears, the dubbing apparatus of this embodiment disables all further dubbing operations. In that case, with the dubbing error display D4 in effect, the user may operate an MD STOP key 19c. The key operation when carried out cancels the high-speed dubbing mode established so far and restores a standby state denoted by an indication in FIG. 11D on the display unit 20. This indication is in fact the same as the display shown in FIG. 11A.

The dubbing error display D4 persists as long as the user does not operate the MD STOP key 19c. While the dubbing error display D4 is in effect, the restricted remaining time on display is decremented as time elapses.

5-2. Operations of HCMS Management

For the above-described dubbing error display D4 to appear upon high-speed dubbing requires that the dubbing apparatus of this embodiment be subject to HCMS management. Under HCMS management, it is stipulated that any one track, once dubbed at a high speed of the dubbing source storage medium, may not be dubbed again at that high speed at least within 74 minutes of the point in time at which the track in question began to be dubbed.

Typical operations of the embodiment under HCMS management are described below. Such HCMS management operations will be described in conjunction with how the HCMS management table 22 is used and how high-speed dubbing is restricted according to the contents of the HCMS management table 22. The dubbing error display D4 shown in FIG. 11C is provided in the course of restricting high-speed dubbing when applicable.

Audio data reproduced from the CD are sub-coded with Q channel data shown in FIGS. 9A through 9C. Upon high-speed digital dubbing by the dubbing apparatus of this embodiment, the Q channel data are transmitted to the system controller 21 along with the audio data. The system controller 21 is capable of recognizing contents of the Q channel data.

When high-speed dubbing of a piece of music (track) has started, the system controller 21 detects a mode 3 ISRC shown in FIG. 9C from the Q channel data obtained at that point.

If an ISRC is detected and if that ISRC does not match any of the ISRCs currently held in the HCMS management table 22, then the detected ISRC is written to the table 22. A typical structure of the HCMS management table 22 is illustrated in FIG. 12.

It is assumed that the timer unit 23 comprises a plurality of timers. When a new ISRC is set to the HCMS management table 22 as explained above, one of unused timers in the timer unit 23 is selectively activated with regard to the newly accommodated ISRC. All timers in the timer unit 23 are each set for a predetermined maximum count of, say, 74 minutes. Once started, a timer performs a count-down from the 74th minute to zero. Alternatively, the timer may effect a count-up from zero to the 74th minute.

Figure 12:
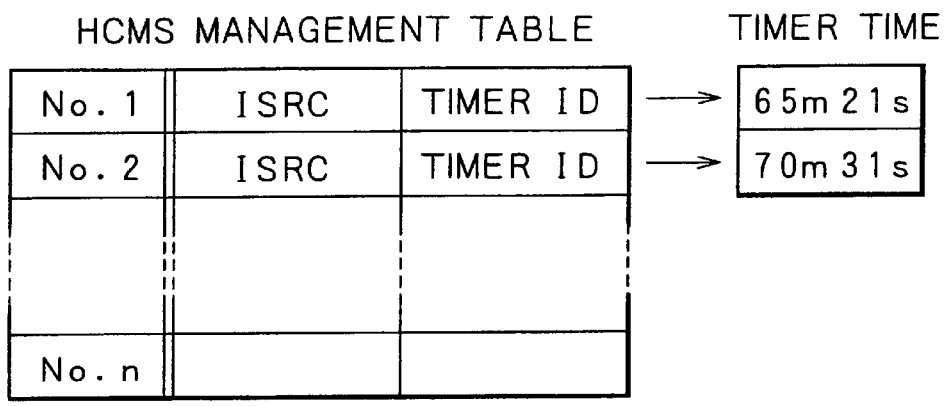
FIG. 12 is a view of an HCMS management table stored in memory.

The HCMS management table 22, as shown in FIG. 12, maintains a one-to-one correspondence between each newly written ISRC and a timer ID identifying the timer started in relation to each new ISRC. That is, a specific CD track designated by the ISRC is stored in the table 22 in correspondence with a time count of a single timer.

The HCMS management table 23 has as many storage regions (No. 1 through No. n) as the number of timers configured in the timer unit 22, each storage region holding a correspondence between an ISRC and a timer ID.

In the HCMS management table 22 of FIG. 12, storage regions Nos. 1 and 2 are shown accommodating ISRCs representing specific tracks. The tracks are in turn related to applicable timer IDs.

The timer whose ID is associated with the storage region No. 1 is shown currently to have a count of 65 minutes, 21 seconds (indicated as "65 m 21 s"); the timer whose ID is related to the storage region No. 2 currently has a count of 70 minutes, 31 seconds (shown as "70 m 31s"). In this example, the track designated by the ISRC held in the storage region No. 1 is subject to an injunction against high-speed dubbing for another 65 minutes, 21 seconds.

When the 74-minute count has elapsed on a timer corresponding to an ISRC written to the HCMS management table 22, the ISRC and the corresponding timer ID are erased from the HCMS management table 22. That is, the relevant ISRC and timer ID information is cleared from the table 22. This is how the HCMS management table 22 is prepared for use with this embodiment.

Suppose that upon high-speed dubbing of a track, the HCMS management table 22 is found to contain the same ISRC as that detected from the audio data that have been reproduced from the CD for high-speed dubbing. In that case, the dubbing apparatus stops the high-speed dubbing process of the track in question the moment the ISRC is detected. That is, the recording of the track having the same ISRC as any one of those held in the HCMS management table 22 is suppressed.

When reproduction of a piece of music (track) is started by the CD section for high-speed dubbing, it takes a very short time for the dubbing apparatus to detect an ISRC. If it is assumed that at least one ISRC (Q channel data in mode 3) occurs unfailingly every 100 sub-coding blocks, with 75 sub-coding blocks approximately corresponding to one second at standard speed, then the ISRC in question is detected substantially within one second at high speed. Such a time period for code detection, being significantly short, varies very little depending on the actual high speed setting in effect.

When the full count on a timer has expired, the corresponding ISRC is cleared from the HCMS management table 22. Once the timer count has elapsed, recording of the track having the ISRC in question can be resumed for high-speed dubbing.

This embodiment, as described, prevents any track once dubbed at high speed from being recorded in another session of high-speed dubbing for the period set on the corresponding timer (e.g., 74 minutes). Attempts at high-speed dubbing of the track are rejected the moment the applicable ISRC is detected. Because any one track recorded previously at high speed cannot be dubbed again at high speed within the time period set on the corresponding timer, the same track cannot be copied frequently in a limited period of time, whereby possible infringement on copyrights is prevented.

The timer time representing the period in which high-speed dubbing of the same track is inhibited is set for 74 minutes under HCMS provisions, on the following grounds:

Most CDs are known to have the maximum recording time of 74 minutes. Where the 74-minute period is set as the timer time in which to suppress repeat high-speed dubbing of a recording source, the setting ensures that any CD will not be copied twice or more frequently during the time it takes to dub the same CD at standard speed. In consequence, CDs may be dubbed only as efficiently as at standard speed.

The dubbing suppression period of 74 minutes or thereabout should not be too inconvenient for general users when they proceed with dubbing for personal use while the injunction remains effective against attempts by users to copy music more frequently than is reasonably considered normal for private enjoyment.

Needless to say, the dubbing suppression period is not limited to 74 minutes and may be extended or curtailed in consideration of the actual use conditions and effectiveness of copyright protection. For example, since one track of music generally plays three minutes on average, the restrictive timer time may be set for three minutes.

The actual number of timers to be prepared in the timer unit 23 may be determined as follows:

It is assumed that high-speed dubbing is performed at quadruple speed and that one track plays 180 seconds (=3 minutes). In that case, the time it takes to record one track by quadruple-speed dubbing is given as $$180/4=45 \text{ (seconds)}$$

If the timer time is set for 74 minutes as described above, the maximum number of tracks that may be recorded in the 74-minute period (4,440 seconds), i.e., from the time a first timer is set until that timer is reset, is calculated as $$4,440/45=98 \text{ (tracks)}$$

That is, when 98 timers or thereabout (e.g., 100 timers) are provided in the timer unit 23, timers will not be exhausted even if different tracks are dubbed successively at the designated high speed. This practically eliminates the possibility of there being no available timer at any point in time.

It may happen that tracks of an exceedingly short playing time each are played back successively so that all timers have been exhausted before the 74-minute period expires on the first-activated timer. In that case, this embodiment suppresses all further high-speed dubbing. Over time, the set time expires on one timer after another beginning with the initially activated timer, and the HCMS management table 22 is cleared correspondingly. Whenever a timer becomes available again for use, the dubbing apparatus is made ready for another session of high-speed dubbing.

How the recording of tracks by high-speed dubbing is restricted will now be described with reference to the flowcharts of FIGS. 13 through 15. Steps constituting the processes in the flowcharts are carried out by the system controller 21.

Figure 13:
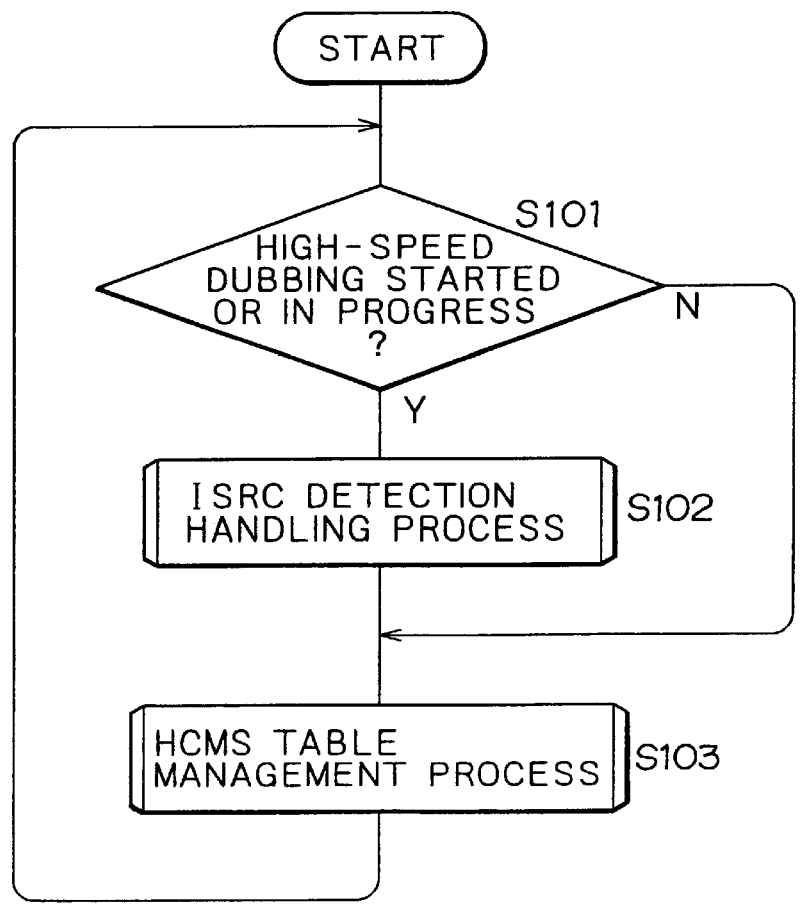
FIG. 13 is a flowchart of steps performed when high-speed dubbing is started.

The steps in FIG. 13 are described first. They are performed continuously as long as the dubbing apparatus of this embodiment is in operation.

In step S101, the system controller 21 checks to see if recording by high-speed dubbing is started on the MD 90 or if high-speed dubbing is again in progress following step S103, to be described later. High-speed dubbing is started in response to a high-speed dubbing request generated by the user operating the operation unit in a suitable manner.

If in step S101 high-speed dubbing is judged to be in progress, then steps S102 and S103 are performed in that order. If standard-speed dubbing is judged to be carried out or if a stopped state, a playback state, or an operation other than dubbing is found to be in effect, the result of the check in step S101 is negative. In that case, step S102 is skipped and step S103 is reached instead.

Step S102 represents an ISRC detection handling process. This process involves creating an HCMS management table 22 based on ISRCs detected from the digital audio data reproduced by the CD section for high-speed dubbing, or executing control measures for restricting track recording, as explained earlier.

Step S103 constitutes an HCMS table management process. The process involves, as described above, effecting a count-down on each of the currently activated timers corresponding to the ISRCs now held in the HCMS management table 22. The ISRC associated with any timer on which the timer time has expired is cleared from the HCMS management table 22.

Figure 14:
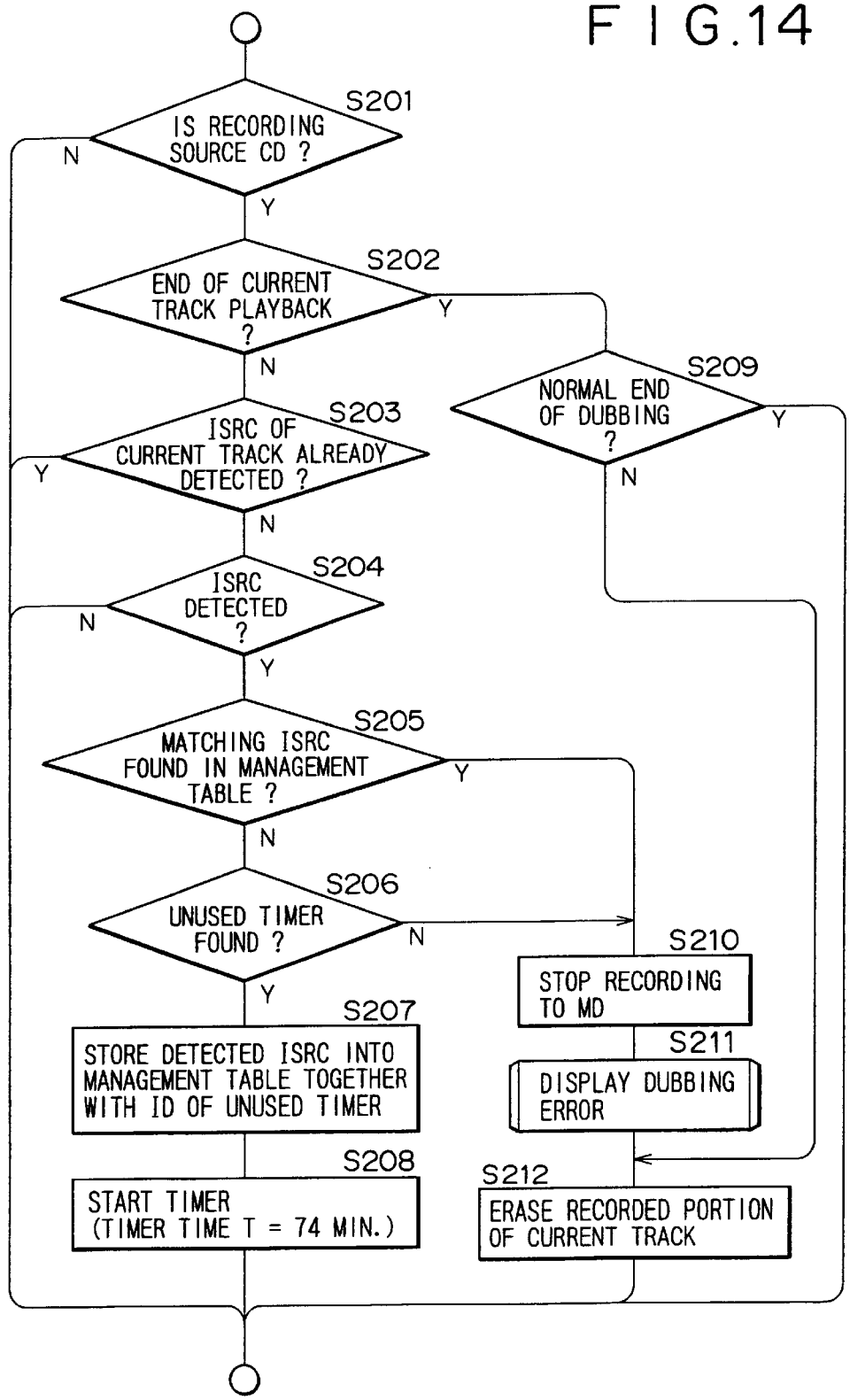
FIG. 14 is a flowchart of steps detailing an ISRC detection handling process S102 included in FIG. 13.

The ISRC detection handling process of step S102 is detailed in FIG. 14. In step S201 of FIG. 14, a check is made to see if the recording source from which data are currently input for high-speed dubbing is a CD.

For the check in step S201, the system controller 21 need only identify what makes up the second bit (Q2) in the control data CTL (Q1 through Q4) shown in FIGS. 9A, 9B and 9C constituting the contents of the Q channel sub-coding data included in the currently input digital audio data. In other words, the system controller 21 need only verify whether the control data CTL (Q1–Q4) are composed of "*0**" (identifying a CD-DA (CD digital audio)). Needless to say, any disc whose format is other than the audio format such as a CD-ROM or CD-I is rejected in step S201.

If in step S201 the recording source is judged to be something other than a CD, all subsequent steps in FIG. 14 are skipped and step S103 of FIG. 13 is reached. If the recording source is judged to be a CD, step S202 is reached.

In step S202, a check is made to see if the currently playing track has ended. This check constitutes detection of a so-called track change. A track change is detected illustratively by recognizing a change of the track number (TNO; see FIG. 9A) in the Q channel data of mode 1 inserted in the digital audio data reproduced by the CD section.

If in step S202 the current track is judged to have ended, step S209 is reached. If the current track is yet to terminate, step S203 is reached.

In step S203, a check is made to see if an ISRC detected from the audio data provided by the currently playing track has already been detected. The ISRC is recognized in a manner to be described later in connection with step S204 and subsequent steps. On detecting an ISRC from the current track, the system controller 21 may set a flag in a RAM 21a indicating the ISRC detection. The flag is cleared when the result of the check in step S202 becomes affirmative.

If the result of the check in step S203 is negative, step S204 is reached. In step S204, a check is made on the Q channel sub-coding data inserted in the audio data from the current track in order to detect an ISRC shown in FIG. 9C. If no ISRC is detected, step S103 is reached. If an ISRC is detected, the detected ISRC is retained and step S205 is reached.

In step S205, the detected ISRC is compared with the contents of the HCMS management table 22 to see whether any one of the ISRCs in the table matches the ISRC in question. If none of the ISRCs in the table 22 matches the detected ISRC, step S206 is reached. If a matching ISRC is found in the HCMS management table 22, step S210 is reached.

In step S206, a check is made to see if any unused timer remains in the timer unit 23. If any currently unused timer is judged left in the timer unit 23, step S207 is reached. If no available timer is judged to remain in the timer unit 23, then step S210 is reached.

In step S207, one of the unused timers in the timer unit 23 is selected. The timer ID of the selected timer and the ISRC detected in step S204 are set to an unused area in the HCMS management table 22.

In step S208, the timer selected in step S206 is activated. Thereafter, a count-down starts on the timer illustratively set for the timer time of 74 minutes, triggered by the process in step S103 to be described later. Obviously, a count-up may alternatively be carried out on the timer from zero up to the 74th minute for the same result.

In step S208, the timer is typically activated following steps S204 and S205 and at about the time the ISRC detected from the reproduced audio data is found to match one of the ISRCs held in the HCMS management table 22. Alternatively, the timer may be started at the end of the recording of the current track. In the alternative case, the same track may be dubbed eventually at high speed only upon elapse of the timer time starting from the end of the recording of the current track. Step S208 is followed by step S103.

If the result of the check in step S202 is affirmative, step S209 is reached. In step S209, a check is made to see if the high-speed dubbing of the current track (of which playback was judged to have ended in step S202 earlier) has normally ended. The normal end in this context means that the data provided by the current track have been dubbed completely from beginning to end onto the MD. An abnormal end, by contrast, signifies one of the following cases: that the high-speed dubbing is suspended by the user performing a stop operation, that the CD is still playing but an exhausted storage capacity of the MD has stopped the dubbing operation, or that the data of the current track have failed to be recorded completely on the MD because of a defective dubbing operation triggered by a disc error on the CD or MD or by other disturbances.

If the result of the check in step S209 is affirmative, step S103 is reached immediately. If the check in step S209 yields the negative result, then step S212 (to be described later) is reached.

Step S210 is reached if the result of the check in step S205 has turned out to be affirmative or if the check in step S206 has yielded the negative result. In step S210, a control process is performed to stop the recording onto the MD 90. Because the same track as the current track has already been dubbed at high speed within the past 74 minutes, the recording of the current track is inhibited. Step 210 is followed by step S211.

In step S211, the system controller 21 causes the display unit 20 to effect the dubbing error display D4 shown in FIG. 11C.

Figure 16:
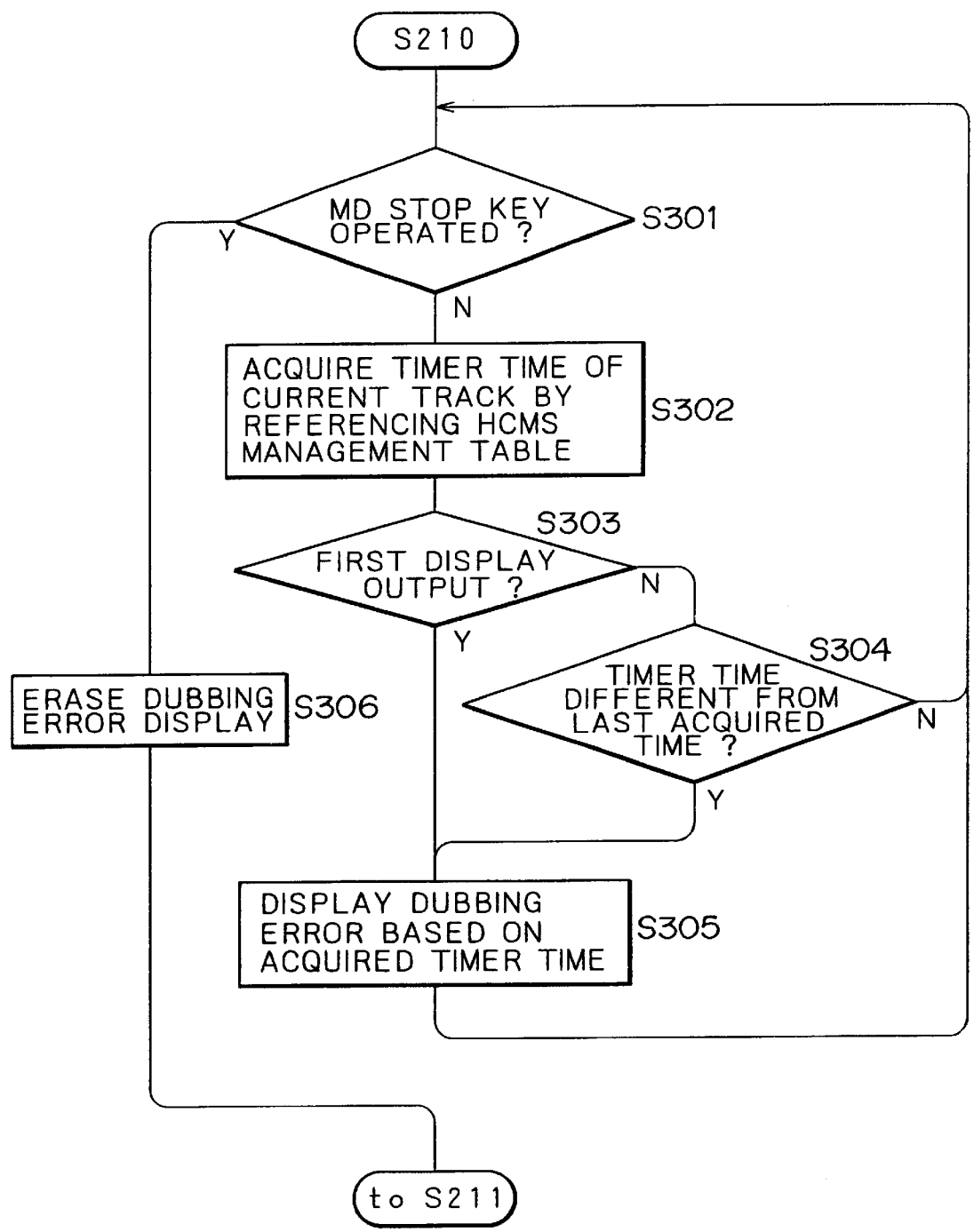
FIG. 16 is a flowchart of steps constituting a dubbing error display process carried out during a high-speed dubbing restriction process.

The process of performing the dubbing error display D4 is constituted by steps shown in FIG. 16. In step S301, a check is made to see if the MD STOP key 19c is operated; this key is used to cancel high-speed dubbing mode as described earlier with reference to FIG. 11C. If in step S301 the MD STOP key 19c is not judged to be operated, step S302 is reached.

In step S302, the timer time of the current track is acquired by referring to the currently held contents of the HCMS management table 22. More specifically, a timer ID is first recognized which is held in the HCMS management table 22 in correspondence with an ISRC that matches the ISRC detected in correspondence from the reproduced audio data furnished by the current track. The current timer-time count on the timer associated with the recognized timer ID is then acquired. Step S302 is followed by step S303.

In step S303, a check is made to see if the dubbing error display D4 is to appear for the first time at this point. The check is made to determine whether the process ranging from step S303 to step S305 is being carried out for the first time since this routine has started.

If the result of the check in step S303 is affirmative, step S305 is reached. In step S305, the dubbing error display D4 shown in FIG. 11C is executed by use of the timer time acquired earlier in step S302. More specifically, display data constituting the dubbing error display D4 are generated by utilizing the acquired timer time, and the display unit 20 is driven in accordance with the generated display data. After step S305, step S301 is reached again.

If the result of the check in step S303 is negative, step S304 is reached. In step S304, a check is made to see if the timer time acquired in the last executed step S302 is different from the timer time used in the display process of the preceding step S305. If the result of the check in step S304 is negative, step S301 is reached and subsequent steps are carried out.

As explained above, steps S301 through S304 are repeated as long as the MD STOP key 19c is not operated and the timer time is not updated by a decrement following the initial display. During the repeated steps, the dubbing error display D4 brought about by the most recently performed step S305 continues.

If the result of the check in step S304 becomes affirmative while steps S301 through S304 are being repeated, then step S305 is performed again, before step S301 is reached. In that case, if the timer unit 23 has any timer updated in keeping with the current track while the dubbing error display D4 persists with no operation made of the MD STOP key 19c, then the updated timer time is reflected in the dubbing error display D4 as the remaining time of injunction against high-speed dubbing.

If the result of the check in step S301 is affirmative following an operation of the MD STOP key, step S306 is reached in which the dubbing error display D4 is cleared. Specifically, the display D4 is replaced by an indication representing the current operation status. At the end of the process in step S306, step S212 of FIG. 14 is reached.

At the time step S210 ends, the audio data provided by the current track have been partially recorded to the MD 90. The partially recorded track data should preferably be erased in view of the convenience for general users and for the sake of copyright protection.

With this embodiment, the current track data partially recorded to the MD are erased in step S212. More specifically, the contents of U-TOC sector 0 on the currently loaded MD 90 are updated so as to turn the partially recorded area of the current track into a free area. At the end of step S212, the system controller 21 goes to step S103.

Whether or not any timer is left unused is determined in step S206 immediately before a reproduction-recording process for high-speed dubbing is actually started, or when tracks are changed. If any timer is judged to be left unused in step S206, the recording process may be stopped before high-speed dubbing is started or before the dubbing of a new track is initiated.

Figure 15:
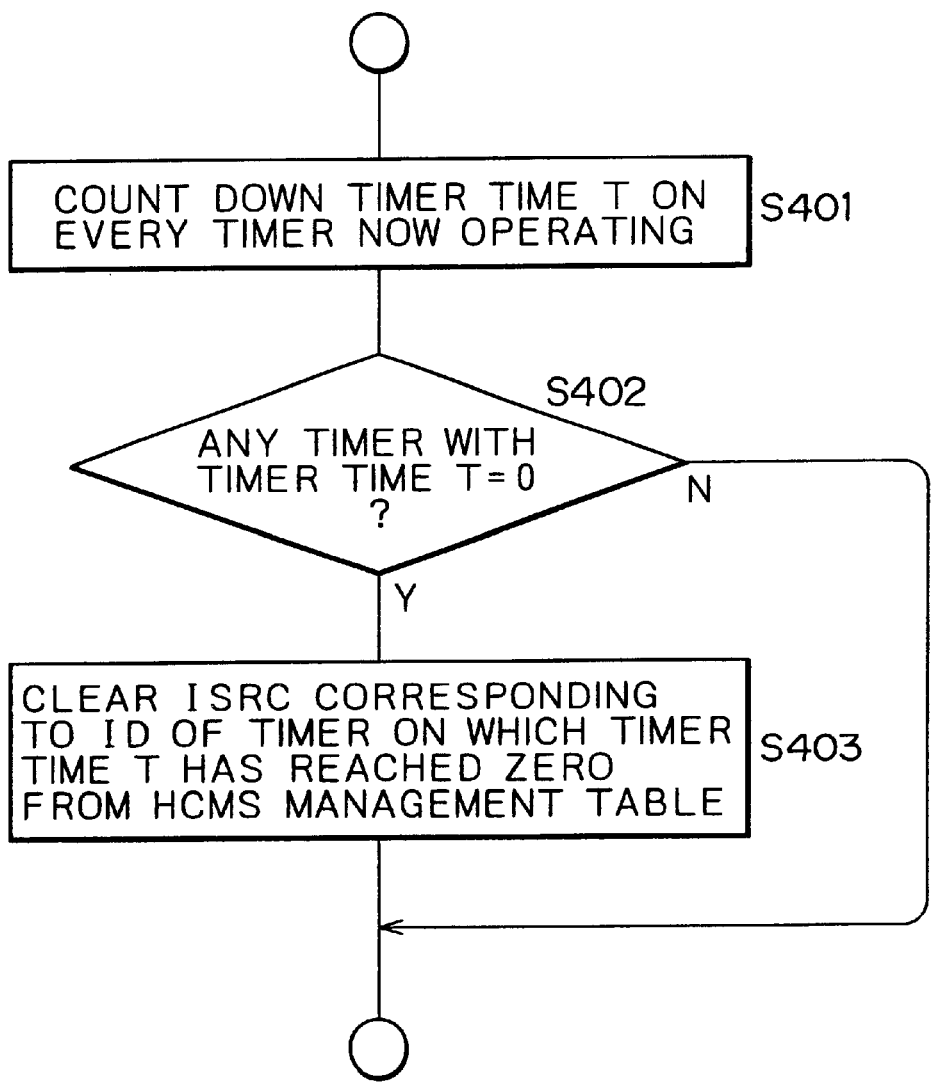
FIG. 15 is a flowchart of steps detailing an HCMS table management process S103 included in FIG. 13.

Step S103 in FIG. 13 constitutes an HCMS management table process that is performed illustratively as shown in FIG. 15. In step S401 of FIG. 15, a timer time count-down is carried out on every timer now operating in the timer unit 23. In step S402, a check is made to see if the timer time has expired (T=0) on any of the timers whose counts are decremented in step S401.

If in step S402 the timer time is not judged to have expired on any one of the timers, further processing in FIG. 15 (i.e., step S104) is skipped and step S101 of FIG. 13 is reached again. If in step S402 any timer is found whose timer time has reached zero (T=0), then step S403 is reached.

Step S403, when carried out, clears from the HCMS management table the ISRC held in correspondence with the timer ID attached to the timer whose timer time has expired (T=0) in step S402. The process permits a new session of high-speed dubbing of the track subjected to the injunction against high-speed dubbing, now that the 74-minute dubbing suppression time has expired on the timer corresponding to the track in question.

Step S403 is followed by step S101 in FIG. 13. If in step S101 an operation other than high-speed dubbing is recognized, the ISRC detection handling process of step S102 is skipped. This makes it possible illustratively to permit standard-speed dubbing of the same track a plurality of times regardless of the timer time setting.

Executing the steps in FIGS. 13 through 16 inhibits repeat high-speed dubbing of the same track within the period set by the timer, whereby HCMS management is implemented. With this embodiment, the dubbing error display D4 described in reference to FIG. 11C is also carried out in the course of HCMS management execution.

Alternatively, identification information other than the ISRC may be utilized in implementing HCMS management in units of tracks. For example, TOC information stored on a CD provides a total playing time, a total number of tracks, and a lead-out address of the CD in question. As explained earlier in connection with FIG. 7A and FIG. 8, the TOC of the CD indicates a start point of each of the recorded tracks in terms of minutes, seconds, and a frame count, as well as a lead-out start point also in terms of minutes, seconds, and a frame count. On the basis of such contents, three kinds of information are provided: total playing time, total track count, and lead-out address. The total playing time is obtained illustratively by adding up the playing times of all tracks on the disc. The total track count is acquired by referencing the track number of the last track specified by "POINT=A1". The lead-out address is gained by referring to the start point of the lead-out track designated by "POINT=A2".

From a broad perspective, the total playing time, total track count and lead-out address are considered items of information specific to each CD. That is, these three information items may be handled as a set of disc-specific information. Combining the disc-specific information identifying a CD with track numbers of that CD constitutes information that serves as track IDs identifying individual tracks on the disc.

If such track IDs are used in place of ISRCs in the HCMS management table in FIG. 12, then HCMS management can be implemented in a manner similar to what was described above. Track IDs are recognized by simply retaining TOC information retrieved from the CD. This eliminates the need, under HCMS management by a track ID-based setup, for reproducing audio data from the CD for the explicit purpose of determining whether or not to permit high-speed dubbing, unlike under the ISRC-based scheme.

For a still simpler form of HCMS management, it is possible to implement a comprehensive copyright protection scheme in units of an entire copy source storage medium such as a CD. More specifically, the above-described disc-specific information (total playing time, total track count, lead-out address) is retained in correspondence with a timer ID for HCMS management. Every time high-speed dubbing is carried out, a disc ID composed of disc-specific information alone is set illustratively to an ISRC field in FIG. 12. At the same time, a timer ID is set in the table so as to start that timer in the timer unit 23 which is designated by the timer ID in question.

When an attempt is made to dub a CD at high speed, the disc ID of that CD is matched against the disc IDs held in the HCMS management table 22. If there is found a matching disc ID in the table 22, the high-speed dubbing of the CD is inhibited; if no matching disc ID is detected, the high-speed dubbing process is allowed to proceed.

In the above setup, copyright protection is managed in units of discs. In other words, even if a track Tr1 alone on a CD is dubbed at high speed, not only the track Tr1 but also the next track Tr2 and all subsequent tracks on the disc are inhibited from another session of high-speed dubbing for 74 minutes starting from the time the track Tr1 began to be dubbed at high speed.

Under such a disc-by-disc HCMS management scheme, the remaining dubbing suppression time is indicated for each entire disc on an HCMS management status display.

6. Variations of HCMS Management Status Display

The description so far of the HCMS management status display has shown that the display, like the dubbing error display D4 of FIG. 11C, is given in a manner indicative of the status of any given track inhibited under HCMS management from any attempt at high-speed dubbing.

According to the invention, forms and output timings of the HCMS management status display are not specifically limited, provided there is a suitable indication of the status of HCMS management regarding each track as a dubbing source. That being the case, some variations of the HCMS management status display are explained below with reference to FIG. 17.

Figure 17:
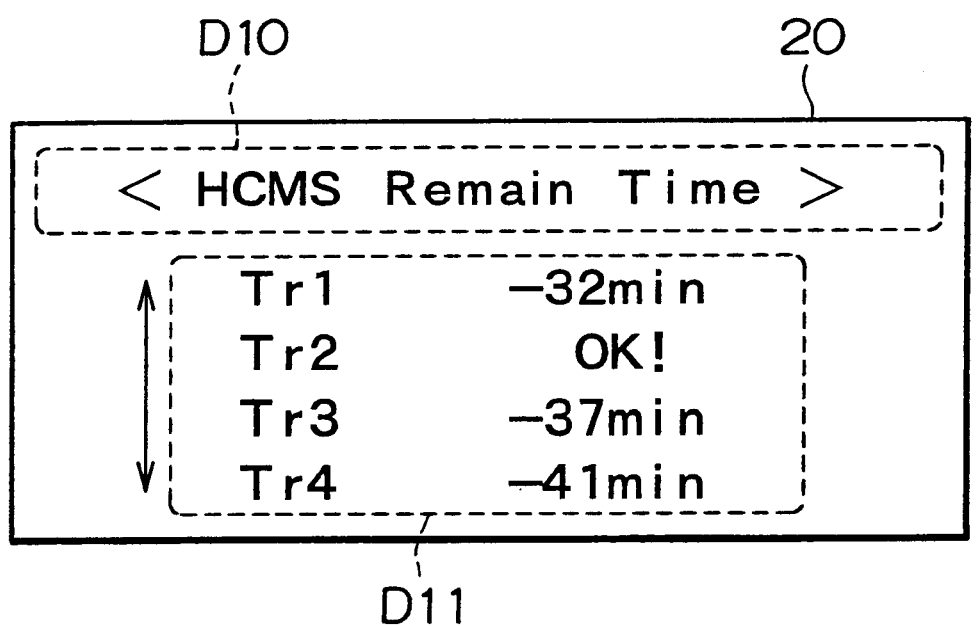
FIG. 17 is a schematic view of another typical display indicating the status of HCMS management.

On the display unit 20 shown in FIG. 17, the upper display area illustratively gives a title display D10 such as <HCMS Remain Time>. The currently displayed information indicates the remaining time of injunction against high-speed dubbing of some of the tracks on the dubbing source storage medium.

Under the title display D10 is a management status display D11 that shows track numbers such as Tr1, Tr2, Tr3 and Tr4 from top to bottom, i.e., the tracks recorded on the CD that serves as the dubbing source storage medium. Each of the track numbers is shown matched with the corresponding remaining time on the right-hand side. Illustratively, track Tr1 is associated with an indication "-32 min" to the right, which means that high-speed dubbing of the track in question becomes possible in 32 minutes. The next track Tr2 is matched with an indication "OK!", which means the track Tr2 may now be subject to high-speed dubbing.

Suitable keys of the operation unit 19 may be operated to scroll up and down the management status display D11 on the display unit 20. The scrolling action allows other track numbers together with their associated remaining time indications to emerge from a hidden state into display on the display unit 20.

That is, the HCMS management status display in FIG. 17 provides an overview of which track is inhibited from high-speed dubbing and which track is permitted for the dubbing from among the tracks on the currently loaded dubbing source storage medium. A comprehensive HCMS management status display such as that in FIG. 17 may illustratively be output when the user performs an appropriate operation or whenever the dubbing apparatus is brought into standby mode.

To implement the overall HCMS management status display above on an ISRC-based HCMS management setup requires that a correspondence be established at least between the ISRCs currently held in the HCMS management table on the one hand and the tracks of the currently loaded CD on the other hand. By contrast, if track IDs based on TOC information obtained from the disc are used for HCMS management, necessary information for a comprehensive display of HCMS management status is acquired by simply comparing the track IDs currently held in the HCMS management table on the one hand with the TOC of the currently loaded CD on the other hand. That is, the comprehensive status display is easier to implement.

The embodiment above and the associated examples have been described on the assumption that there exist injunctions only against high-speed dubbing. However, future regulations of copyright protection or manufacturers' willingness to better protect copyrights irrespective of the current HCMS provisions may require that standard-speed dubbing be restricted in some way as well. For example, there may be devised a copy management system whereby any track representing a piece of music, once dubbed, may not be dubbed again regardless of dubbing speeds for 74 minutes starting from the time the track in question began to be dubbed.

In fact, the embodiment of the invention described above may be modified to comply with the above type of copy management system restricting standard-speed dubbing as well. Whether high-speed or standard-speed dubbing is in effect, any track, once dubbed, is prevented under copy management from being dubbed again until a predetermined period of time elapses since the track in question began to be dubbed.

Suppose that the dubbing error display D4 of FIG. 11C is carried out by a speed-free copy management setup. In that case, if an attempt is made to dub a track currently inhibited from being dubbed in high-speed or standard-speed dubbing mode, the dubbing error display D4 is given in conjunction with an error status display D5. The display D5 shows an error code and a remaining inhibited time regarding the track in question.

Suppose now that a comprehensive HCMS management status display such as that in FIG. 17 is performed under the above type of copy management scheme. In that case, the management status display D11 lists remaining dubbing suppression times with respect to individual tracks currently inhibited from dubbing regardless of high-speed or standard-speed dubbing being in effect.

While preferred embodiments of the invention have been described using specific terms, such description is for illustrative purposes only, and it is to be understood that changes and variations may be made without departing from the spirit or scope of the claims that follow. For example, whereas the dubbing apparatus above was shown integrating an MD recorder/player for driving a dubbing destination storage medium with a CD player for driving a dubbing source storage medium, this is not limitative of the invention. Alternatively, the invention also applies to a system wherein a recording apparatus handling the dubbing destination storage medium is physically separated from a reproducing apparatus dealing with the dubbing source storage medium.

The invention also applies to dubbing systems comprising a plurality of MD recorder/players as well as to dubbing systems including a recording or reproducing apparatus compatible with such tape media as DATs and cassette tapes.

Furthermore, the recording sources to be dubbed are not limited to audio data reproduced from media as long as the sources are properly managed by a copy management system. What may be adopted as recording sources in future may include audio data received by terrestrial radio tuners and satellite digital broadcast tuners.

As described and according to the invention, any one program, once dubbed at a high speed, may not be dubbed again at that high speed for a predetermined period of time since the program in question has begun to be dubbed. An ongoing high-speed dubbing operation is also subject to restrictions depending on the program management status currently in effect, whereby copyright protection is properly implemented. In addition, the inventive apparatus outputs a dubbing management status display reflecting how the dubbing process is currently managed. The dubbing apparatus thus affords users a comprehensive display of information related to the currently enforced restrictions on high-speed dubbing. This type of apparatus proves to be more convenient than before to users wishing to make use of the dubbing facility.

The dubbing management status display of this invention is output immediately after a high-speed dubbing request for a program currently inhibited from such dubbing is canceled. Viewing the display thus output, the user recognizes that his or her attempt to dub the restricted program at high speed has result in the current injunction against high-speed dubbing. In other words, the display spares the user from being worried or become distrustful of normal functioning of the apparatus.

The dubbing management status display is preferably given regarding part or all of the programs stored on a dubbing source storage medium. This feature makes it possible for the user to readily grasp the current management status regarding a plurality of programs held on the source storage medium in question.

The dubbing management status display is preferably arranged to indicate remaining time periods that must elapse before the corresponding individual programs are permitted for a repeat session of high-speed dubbing. By taking into account such a remaining time display, the user may proceed with high-speed dubbing more efficiently than before. That is, the inventive dubbing management status display provides the user with useful information that has not been offered before.

What is claimed is:

1. A dubbing apparatus for dubbing programs from a first storage medium onto a second storage medium, said dubbing apparatus comprising:

clocking means for starting to clock the time when a program held on said first storage medium starts being dubbed onto said second storage medium at a high speed over a period shorter than an actual playback time;

storing means for storing the times clocked by said clocking means regarding individual programs held on said first storage medium;

operating means for selecting any one of high-speed dubbing and standard-speed dubbing;

judging means which, if said operating means selects high-speed dubbing of a given program held on said first storage medium, then judges whether the clocked time regarding the program in question exceeds a predetermined time period;

controlling means for permitting high-speed dubbing if said judging means judges the clocked time regarding the program in question to have exceeded said predetermined time period, said controlling means further inhibiting high-speed dubbing if said judging means judges the clocked time regarding the program in question not to have exceeded said predetermined time period; and displaying means for indicating that high-speed dubbing is inhibited when said judging means has judged the clocked time regarding the program in question not to exceed said predetermined time period.

2. A dubbing apparatus according to claim 1, wherein said displaying means indicates a waiting time to be observed before high-speed dubbing is again permitted.

3. A dubbing apparatus according to claim 1, wherein said displaying means indicates waiting times to be observed before high-speed dubbing is again permitted regarding individual programs.

4. A dubbing apparatus according to claim 1, further comprising:

identifier generating means for generating an identifier based on signals held on said first storage medium, said identifier identifying whether said first storage medium serving as a recording source was previously subjected to high-speed dubbing;

wherein said identifier generated by said identifier generating means is stored into said storing means in correspondence with the clocked time provided by said clocking means.

5. A dubbing apparatus according to claim 1, wherein signals held on said first storage medium comply with International Standard Record Code provisions.

6. A dubbing apparatus according to claim 5, further comprising:

comparing means which, if said first storage medium is replaced by another storage medium, then compares the identifier stored in said storing means with an identifier generated by said identifier generating means for the new storage medium; and second judging means which, if said identifier stored in said storing means is found upon comparison to match the identifier generated by said identifier generating means for said new storage medium replacing said first storage medium, then judges that said new storage medium was previously subjected to high-speed dubbing;

wherein said second judging means further judges that said new storage medium was not previously subjected to high-speed dubbing if said identifier stored in said storing means is not found upon comparison to match the identifier generated by said identifier generating means for said new storage medium replacing said first storage medium.

7. A dubbing apparatus according to claim 1, wherein signals held on said first storage medium represent a total playback time and a stored program count.

8. A dubbing method for inhibiting high-speed dubbing for a first predetermined time period if, at a time of high-speed dubbing of a program from a first storage medium onto a second storage medium over a period shorter than an actual playback time, said first storage medium is found to have been subjected to high-speed dubbing earlier by a second predetermined time period, said dubbing method comprising the steps of:

firstly judging whether high-speed dubbing of the program in question from said first storage medium onto said second storage medium is designated;

if high-speed dubbing of said program from said first storage medium onto said second storage medium is judged designated in said first judging step, then secondly judging whether said program held on said first storage medium was subjected to high-speed dubbing said second predetermined time period earlier;

if said program held on said first storage medium is judged in said second judging step to have been subjected to high-speed dubbing said second predetermined time period earlier, then inhibiting high-speed dubbing of said program over said first predetermined time period; and indicating that high-speed dubbing of said program is being inhibited.

9. A dubbing method according to claim 8, further comprising the step of displaying a waiting time to be observed before high-speed dubbing of said program is again permitted.

10. A dubbing method according to claim 8, further comprising the step of displaying waiting times to be observed before high-speed dubbing is again permitted regarding individual programs held on said first storage medium.

* * * * *